(12) United States Patent
Shioya et al.

(10) Patent No.: US 6,216,989 B1
(45) Date of Patent: Apr. 17, 2001

(54) SUPPORT STRUCTURE AND DISPLAY APPARATUS EQUIPPED WITH THE SUPPORT STRUCTURE

(75) Inventors: Yasushi Shioya, Atsugi; Osamu Hoshino, Ebina; Takao Miyamoto, Chigasaki; Akio Yoshida, Hiratsuka; Hiroshi Takabayashi, Atsugi; Toyohide Miyazaki, Ibaraki-ken; Toshiaki Itazawa; Takashi Yamamoto, both of Yamato, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/620,608

(22) Filed: Mar. 22, 1996

(30) Foreign Application Priority Data

| Mar. 22, 1995 | (JP) | 7-062991 |
| Mar. 22, 1995 | (JP) | 7-062992 |
| Mar. 22, 1995 | (JP) | 7-063212 |
| Mar. 22, 1995 | (JP) | 7-063221 |

(51) Int. Cl.[7] .................................................. F16L 3/00
(52) U.S. Cl. ................. 248/122.1; 248/917; 248/292.13; 248/121.1
(58) Field of Search .................... 248/121.1, 917–23, 248/291.1, 292.13, 122.1

(56) References Cited

U.S. PATENT DOCUMENTS

| 4,438,458 | * | 3/1984 | Munscher | 248/917 X |
| 4,453,689 | * | 6/1984 | Ellis et al. | 248/921 X |
| 4,561,726 |   | 12/1985 | Goodby et al. | |
| 4,589,996 |   | 5/1986 | Inoue et al. | |
| 4,592,858 |   | 6/1986 | Higuchi et al. | |
| 4,621,782 | * | 11/1986 | Carlson et al. | 248/923 X |
| 4,669,694 | * | 6/1987 | Malick | 248/923 X |
| 4,754,942 |   | 7/1988 | Berg et al. | |
| 4,834,329 | * | 5/1989 | Delapp | 248/923 X |
| 4,944,481 | * | 7/1990 | Yurchenco et al. | 248/923 X |
| 5,028,913 | * | 7/1991 | Kitamura | 248/919 X |
| 5,043,846 | * | 8/1991 | Kinoshita | 248/919 X |
| 5,107,402 | * | 4/1992 | Malgouires | 248/921 X |
| 5,108,062 | * | 4/1992 | Detwiler | 248/923 X |
| 5,125,610 |   | 6/1992 | Queau | |
| 5,329,289 | * | 7/1994 | Sakamoto et al. | 248/922 X |
| 5,335,142 |   | 8/1994 | Anderson | 361/681 |
| 5,354,028 |   | 10/1994 | Kitamura | 248/292.1 |
| 5,566,048 |   | 10/1996 | Esterberg et al. | 361/681 |

FOREIGN PATENT DOCUMENTS

| 3610151 | 8/1987 | (DE). |
| 9012218 | 10/1990 | (DE). |
| 9103412 | 6/1991 | (DE). |
| 0163788 | 12/1985 | (EP). |
| 0227067 | 7/1987 | (EP). |
| 0446414 | 9/1991 | (EP). |
| 2111357 | 6/1983 | (GB). |
| 59-99111 | 6/1984 | (JP). |
| 6230344 | 8/1994 | (JP). |
| WO9012356 | 10/1990 | (WO). |

* cited by examiner

*Primary Examiner*—Ramon O. Ramirez
*Assistant Examiner*—Kimberly Wood
(74) *Attorney, Agent, or Firm*—Fitzpatrick, Cella, Harper & Scinto

(57) ABSTRACT

A support structure for a body to be supported, such as a display unit, includes a support base, a stand support held upright by the support base, and an attachment member for attaching a body to be supported thereto laterally held by the stand support. The stand support and the attachment member may be coupled to each other in an electrically insulated state. The body to be supported may be mounted on the attachment member via a tilting mechanism for holding the support body at an arbitrarily vertically tilted angle from a home position.

36 Claims, 31 Drawing Sheets

(a)

(b)

(a)

(b)

SUPPORT STRUCTURE AND DISPLAY APPARATUS EQUIPPED WITH THE SUPPORT STRUCTURE

FIELD OF THE INVENTION AND RELATED ART

The present invention relates to a support structure capable obviating adverse effects of electromagnetic waves emitted from and incident to electronic apparatus or devices, and a display apparatus equipped with the support structure.

The present invention also relates to a support structure including a tilting mechanism for tiltably supporting a body to be supported, such as a display unit, and also a display apparatus including the support structure such that a display unit can be vertically tilted and laterally turned without losing stability.

In recent years, there have been remarkably developed electronic devices utilizing electromagnetic wave, such as portable telephones. Accordingly, electromagnetic waves (radiation interference waves) radiated from electronic devices has been causing electromagnetic and electric wave difficulties on surrounding apparatus. For this reason, it is required to pay attention to electromagnetic compatibility (EMC) of an apparatus or system so that it is free from an electromagnetic environmental condition and free from an adverse effect to other apparatus so as not to cause performance deterioration or mal-function.

The EMC measures include a reduction of electromagnetic interference (EMI) inclusive of unnecessary radiation of unnecessary electromagnetic signals or electromagnetic noise causing performance deterioration, mal-function or failure of electronic apparatus, and immunity from electromagnetic susceptibility (EMS) of normally operating even if the electronic apparatus receives electromagnetic interference from other apparatus.

In Japan, it has become obligatory to reduce the radiation interference wave emitted from an electronic apparatus to below a prescribed level according to VCCI standards. In the United States and Europe, FCC standards and ES standards stipulate similar obligations, respectively.

Radiation interference waves exceeding the prescribed level is generally given by a harmonic component issued from an electronic circuit having a high clock pulse frequency, and only a portion of the frequency range of the harmonic exceeds the prescribed level. Accordingly, if a measure is taken to reduce the amount of the frequency exceeding the limit to below a certain low level, the radiation interference wave can be economically and effectively suppressed.

On the other hand, flat displays, such as a liquid crystal display apparatus have been rapidly developed, and the size thereof is being gradually enlarged. It has been a recent trend to support a large-area flat display apparatus by a lateral H-shaped or a reverse T-shaped metal support structure of metal material in view of factors, such as restrictions in designing and mechanical structure and for economical reasons.

However, such an ordinary stand support structure for electronic apparatus can be resonant with a certain frequency of radiation interference waves to amplify the radiation interference wave.

On the other hand, as a support structure for a display apparatus for a personal computer or word processors, there has been known a type including a tilting mechanism for adjusting a vertical inclination angle of a display unit, whereby a display screen or surface of a display unit such as a CRT or a liquid crystal panel can assume not only an upright position but also a vertically inclined (tilted) position.

A display apparatus is generally composed of a display unit having a display screen or surface and a support structure supporting the display unit. Tilting mechanisms are generally disposed between the display unit and the support structure and at positions in a manner of projecting laterally (i.e., leftward and rightward) out of the display unit to be recognizable from an operator side. The left and right tilting mechanisms are disposed to have an imaginary tilting axis which couples them and pierces the display unit laterally. An operator can tilt the display unit about the tilting axis and stably hold the display unit at a desired tilted angle. Thus, an operator can set the display screen at an arbitrary angle easy for recognition to have a better recognizability of characters or images on the display screen, e.g., by lightly pushing or pulling an upper end portion on the front face of the display unit. For example, in case where the display screen is given by a liquid crystal panel, the recognizability of the display can be remarkably affected by an angle for viewing the display screen, so that such a tilting mechanism is important.

In recent years there is a trend of requiring a larger area display unit, whereas a support structure as an accessory device for the display unit is required to be further smaller in size. This means that the necessary unit is large enough, but the other member is minimized within a possible extent, e.g., so as to reduce an area on a desk occupied by the display apparatus.

In the above-mentioned display apparatus, however, as the tilting mechanisms disposed at the left and right sides project leftward and outward, respectively, out of the sides of the display unit, it is difficult to further reduce the lateral width of the support structure alone and also of the whole display apparatus.

As a solution to the above-difficulty, it may be conceived of to move the left and right tilting mechanisms from the lateral sides to the back of the display unit. By this measure, it is possible to hide the tilting mechanisms from the viewing field of a display apparatus operator and provide a better design appearance. As a result of the above measure, however, the tilting axis is moved rearward along with the tilting mechanism, a large distance occurs between the gravity center and the tilting axis to provide a different or uneasy touch during the tilting operation. That is, in the operation for tilting the display unit, the tilting operation in the direction of the display unit weight is easy or light but the tilting in the opposite direction is heavy. More specifically, in the case where the tilting axis is shifted rearward from the gravity center of the display unit, the tilting is performed easily, i.e., at a light force, by pulling an upper front position of the display unit toward the operator side to direct the display screen downward, but a heavy force is required in the opposite tilting operation of pushing the upper front position away from the operator to direct the display screen upward. In case where the upward and downward tilting operations require too large a difference in operation force, the operator can assume it as a trouble or failure. The uneasy touch during the tilting operation can be a serious problem in a trend of requiring a larger display unit.

Among such display apparatus, there are some apparatus wherein the tilting or turning center of the display unit and the gravity center of the display apparatus are horizontally deviated from each other. In such display apparatus, when the display unit is vertically tilted up and down, the gravity center is moved forward and backward and also up and down.

In such display apparatus, when the gravity center goes out of an effective support region formed by a setting surface on which the support base is disposed, the display apparatus is caused to fall down. This difficulty becomes more serious in view of the above-mentioned requirement for a smaller support structure.

On the other hand, some display apparatus include a support structure allowing leftward and rightward lateral turning of the display unit. Further, some display apparatus include a display unit having a weight and a size exceeding those of the stand and post member of the support structure. In this case, when the display unit is laterally turned particularly in combination with a vertical tilting, the gravity center of the display apparatus is liable to be moved. Also, in this case, when the gravity center of the display unit is moved out of an effective supporting region formed by a setting surface on which the support base is disposed, the display apparatus is caused to fall down.

Accordingly, there has been desired a support structure capable of always stably supporting a display unit even if the display unit is vertically tilted or/and laterally turned within a maximum tolerable angle, and a display apparatus including such a support structure is also desired.

SUMMARY OF THE INVENTION

In view of the above-mentioned circumstances, an object of the present invention is to provide a support structure including a stand support for supporting a display unit, which support is not resonant with a certain frequency but satisfies electromagnetic environmental compatibility to prevent amplification of radiation interference component, and a display apparatus including such a support structure.

Another object of the present invention is to provide a support structure allowing a further reduction in lateral size of an apparatus including the support structure and also removing an uneasy touch during a tilting operation of a display unit, and also a display apparatus having good observability including such a support structure.

Another object of the present invention is to provide a display apparatus including a display unit supported in an upright position wherein the display unit can be stably held even when it is vertically tilted or/and laterally turned within maximum tolerable angles.

According to the present invention, there is provided a support structure for a body to be supported, comprising: a support base, a stand support held upright by the support base, and an attachment member for attaching a body to be supported thereto laterally held by the stand support, wherein said stand support and said attachment member are coupled to each other in an electrically insulated state.

According to the present invention, there is also provided a display apparatus including the support structure and a display unit mounted on the support structure as a body to be supported.

As a result, it becomes possible to prevent a resonance of the stand support with radiation interference waves from or to the body to be supported.

According to another aspect of the present invention, there is provided a support structure for supporting a body to be supported tiltably vertically from a prescribed position about a laterally extending tilt axis, comprising:

a tilting mechanism having said tilt axis at a position shifted by a deviation X in a horizontal direction from a gravity center of the body to be supported for stably holding the body to be supported at an arbitrary tilt angle within a prescribed tiltable angle range about the tilt axis, and a support structure body for supporting the body to be supported via the tilting mechanism, wherein said tilting mechanism includes a resistance force adjusting mechanism which generates a downward torque $Tr_1$ and an upward torque $Tr_2$ larger than $Tr_1$, wherein the downward torque $Tr_1$ is a torque exerted by the tilting mechanism in resistance to an operation force for upwardly tilting the body to be supported, and the downward torque $Tr_2$ is a torque exerted by the tilting mechanism in resistance to an operation force for downwardly tilting the body to be supported, the downward direction agreeing to a direction of a torque WX caused by an own weight W of the body to be supported and the deviation X, and the upward direction being opposite thereto, all the torques being taken about the tilt axis.

As a result, it is possible to reduce a difference in tilting operation force between upward and downward tilting operations, thus reducing an uneasy touch during the tilting operation of the body to be supported.

According to the present invention, there is also provided a display apparatus including the support structure and a display unit supported by the support structure as a body to be supported.

According to still another aspect of the present invention, there is provided a display apparatus, comprising: a support structure disposed on a planar setting surface, and a display unit supported by the support structure; wherein said support structure includes a support base having on its lower surface a plurality of contacts or a continuously extending contact directly contacting the setting surface, said plurality of contacts when sequentially connected or said continuously extending contact being disposed to surround an effective support region such that a vertical line drawn to a horizontal reference plane from a gravity center of the display apparatus disposed on the setting surface inclined at a maximum allowable slope angle θ in a front direction and a rear direction, respectively, of the display apparatus passes through said effective support region.

In a preferred embodiment, the display apparatus has a gravity center which is movable in a front-to-rear direction and in a vertical direction, and said effective support region is set to have a depth D satisfying:

$$D > X_4 + (h_1 + h_2)\tan\theta,$$

wherein $h_1$ denotes a height of the gravity center from the setting surface when the gravity center is moved to its foremost position, $h_2$ denotes a height of the gravity center from the setting surface when the gravity center is moved to its rearmost position, $X_4$ denotes a distance between the foremost and rearmost positions, and D denotes a depth in the front-to-rear direction of the effective support region taken along a line passing through an intersection of said vertical line with the effective support region.

In case where the maximum allowable slope angle is different between the front and rear directions, the depth D may preferably be determined based on the following relationship:

$$D > X_4 + h_1 \tan\theta_1 + h_2 \tan\theta_2,$$

wherein $\theta_1$ denotes a maximum allowable slope angle in a front direction and $\theta_2$ denotes a maximum allowable slope angle in a rear direction.

The support structure may preferably be provided with a tilting mechanism for adjusting vertical tilt angles of the display unit in up and down directions.

As a result, the display apparatus can be stably held even when the display unit is tilted up and down.

According to a further aspect of the present invention, there is provided a display apparatus, comprising: a support structure disposed on a planar setting surface, and a display unit supported by the support structure; wherein said support structure includes a support base having on its lower surface a plurality of contacts or a continuously extending contact directly contacting the setting surface, said plurality of contacts when sequentially connected or said continuously extending contact being disposed to surround an effective support region such that a vertical line drawn to a horizontal reference plane from a gravity center of the display apparatus disposed on the setting surface inclined at a maximum allowable slope angle $\theta$ in a left direction and a right direction, respectively, of the display apparatus passes through said effective support region.

In a preferred embodiment, the display apparatus has a gravity center which is movable in left and right directions, and said effective support region is set to have a width B satisfying:

$$B > 2h \cdot \tan \theta + X_5,$$

wherein h denotes a height of the gravity center, $X_5$ denotes a distance between leftmost and rightmost allowable positions of the gravity center, and B denotes a width in the left-to-right direction of the effective support region taken along a line passing through an intersection of said vertical line and the effective support region.

In case where the maximum allowable slope angle is different between the left and right directions, the width B may preferably be determined based on the following relationship:

$$V > h(\tan \theta_3 + \tan \theta_4) + X_5,$$

wherein $\theta_3$ denotes a maximum allowable slope angle in a left direction and $\theta_4$ denotes a maximum allowable slope angle in a right direction.

The support structure may preferably be provided with a tilting mechanism for adjusting vertical tilt angles of the display unit in up and down directions.

The support structure may further preferably be provided with a turnable base for supporting the display unit turnably about a vertical axis perpendicular to the base.

As a result, the display apparatus can be stably held even when the display unit is laterally turned in addition to the vertical tilting operations.

These and other objects, features and advantages of the present invention will become more apparent upon a consideration of the following description of the preferred embodiments of the present invention taken in conjunction with the accompanying drawings.

Figure 1:
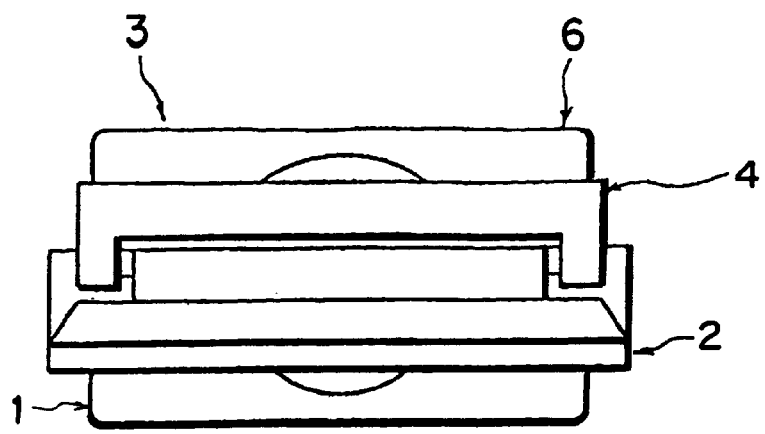
FIGS. 1A, 1B and 1C are a front view, a top plan view and a side view, respectively, of a first embodiment of the display apparatus including a support structure according to the invention.
Figure 1:
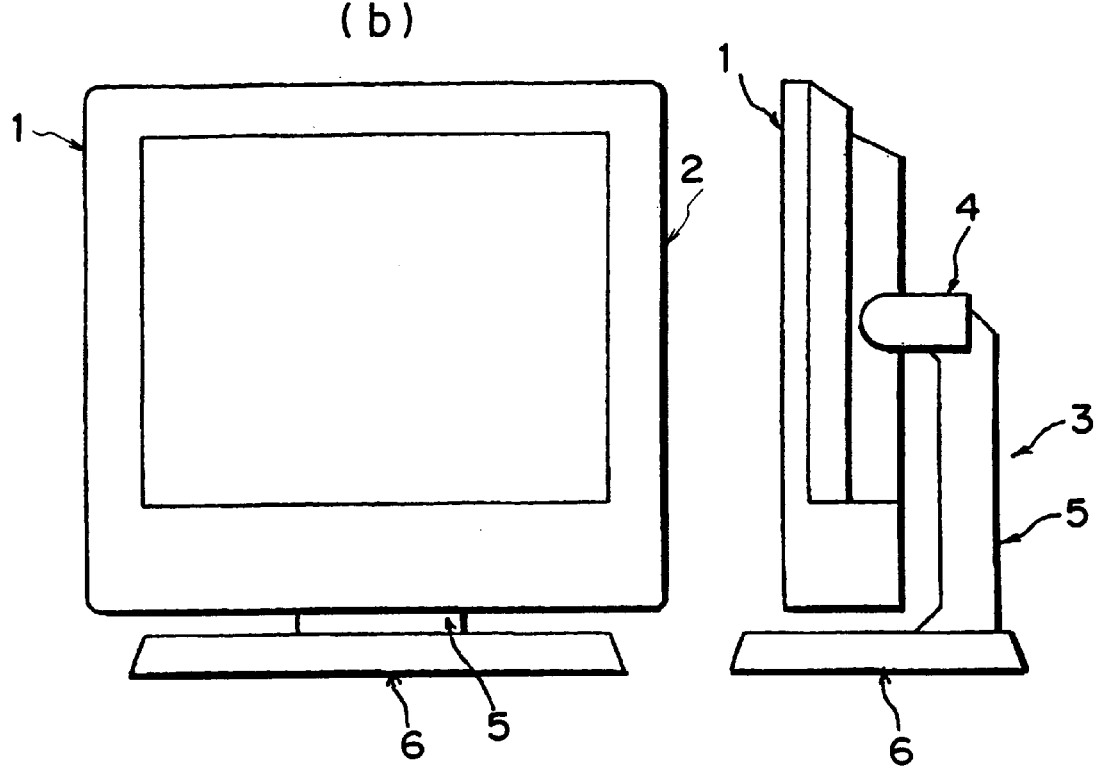
Figure 2:
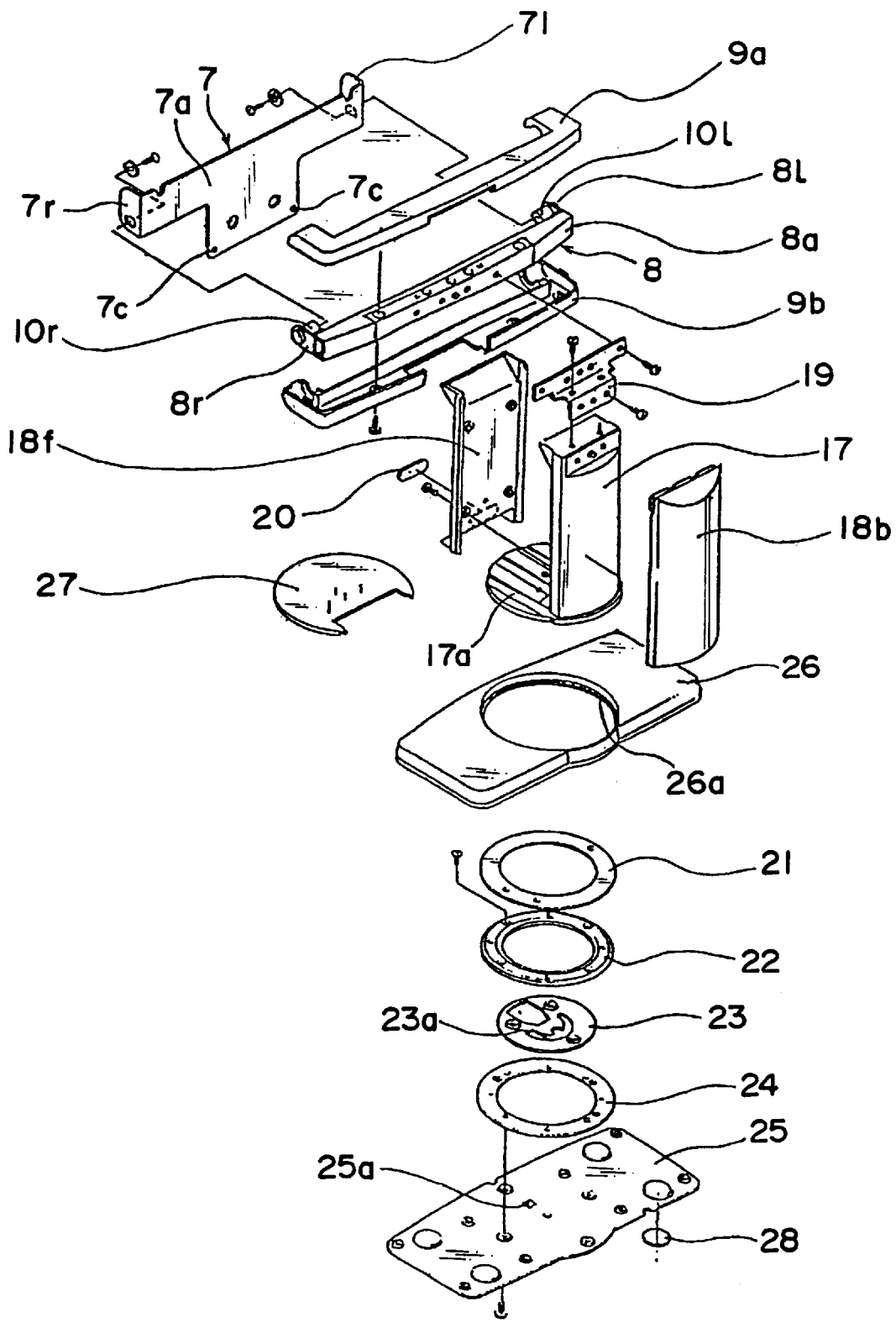
FIG. 2 is an exploded perspective view of the support structure.

Incidentally, some reference numerals representing major components or members shown in the accompanying drawings are remarked hereinbelow.

2 ... body to be supported (display unit),
3 ... support structure,
4 ... support structure body (display attachment member),
6 ... support base,
7 ... tilting member (display holder),
8 ... support arm,
10, 10r, 10l ... tilting mechanism (resistance force adjusting mechanism),
12 ... axis member (tilt axis, pivot),
13 ... locked spring,
W ... weight of display unit,
X, $X_1$, $X_2$ ... deviation,
$Tr_1$ ... downward torque,
$Tr_2$ ... upward torque,
ΔT ... torque difference,
F1, F2 ... operation force,
$l_1$ ... vertical distance from a tilt axis to an application point,
$l_2$ ... vertical distance from a tilt axis to a gravity center.

DESCRIPTION OF THE PREFERRED EMBODIMENTS

FIGS. 1A, 1B and 1C are a front view, a plan view and a side view, respectively, of a first embodiment of the display apparatus according to the present invention. Referring to FIGS. 1A–1C, a flat display apparatus 1 includes a flat display unit 2 (as a body to be supported), such as a plasma display, an electroluminescence display or a liquid crystal display (inclusive of those using a ferroelectric liquid crystal and a nematic liquid crystal), and a stand-type support structure 3 for supporting the display unit from its back.

<Support Structure>

A support structure 3 according to the first embodiment will now be described.

Figure 27:
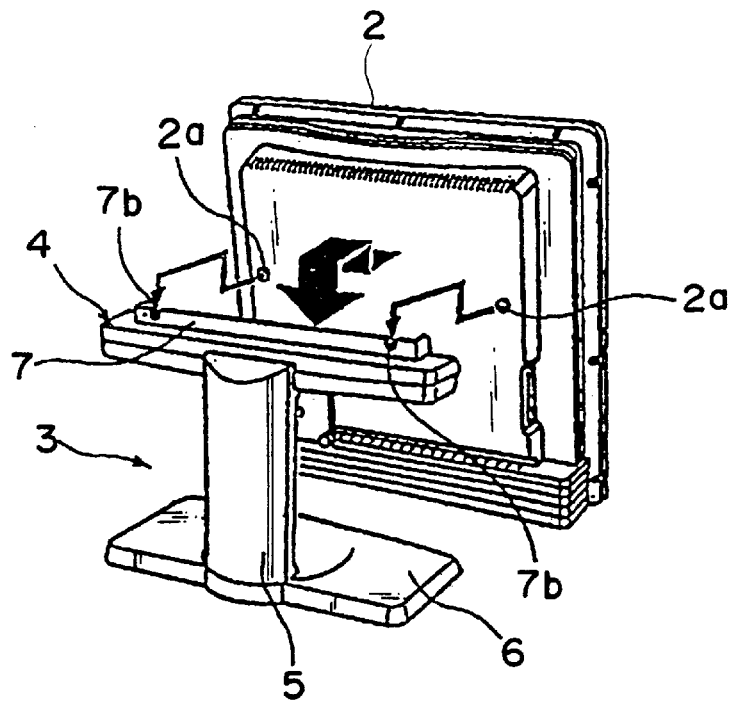
FIG. 27 is a perspective view for illustrating a manner of mounting and detaching of a display unit on and a tilting member of a support structure.
Figure 28:
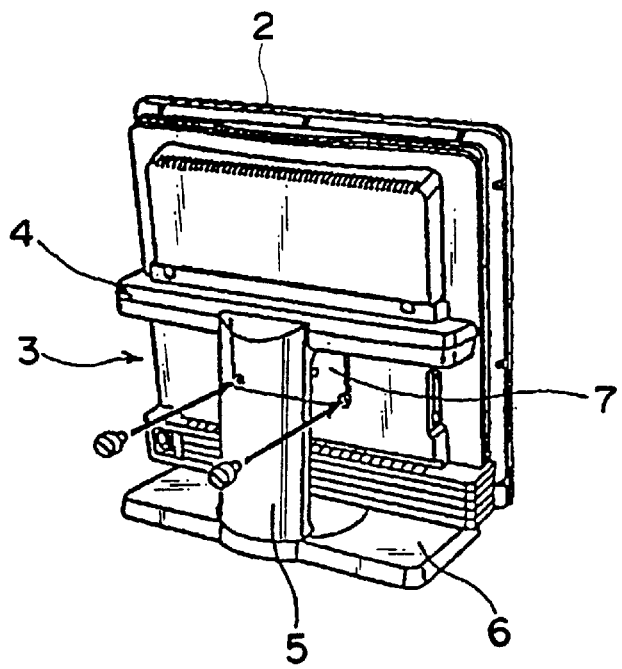
FIG. 28 is a perspective view showing a display unit mounted n a tilting member.

As shown in FIGS. 27 and 28, the support structure 3 is formed in the shape or roughly a laterally fallen character "H" as view from its back side, and its rotation or tilting center (pivot) is positioned behind the gravity center of a combination of the support structure 3 and the display unit 2 mounted thereon. The support structure 3 supports the display unit 2 so that the display unit 2 can assume an arbitrary angular position (i.e., a face direction) within prescribed vertical and lateral angular ranges.

Figure 45:
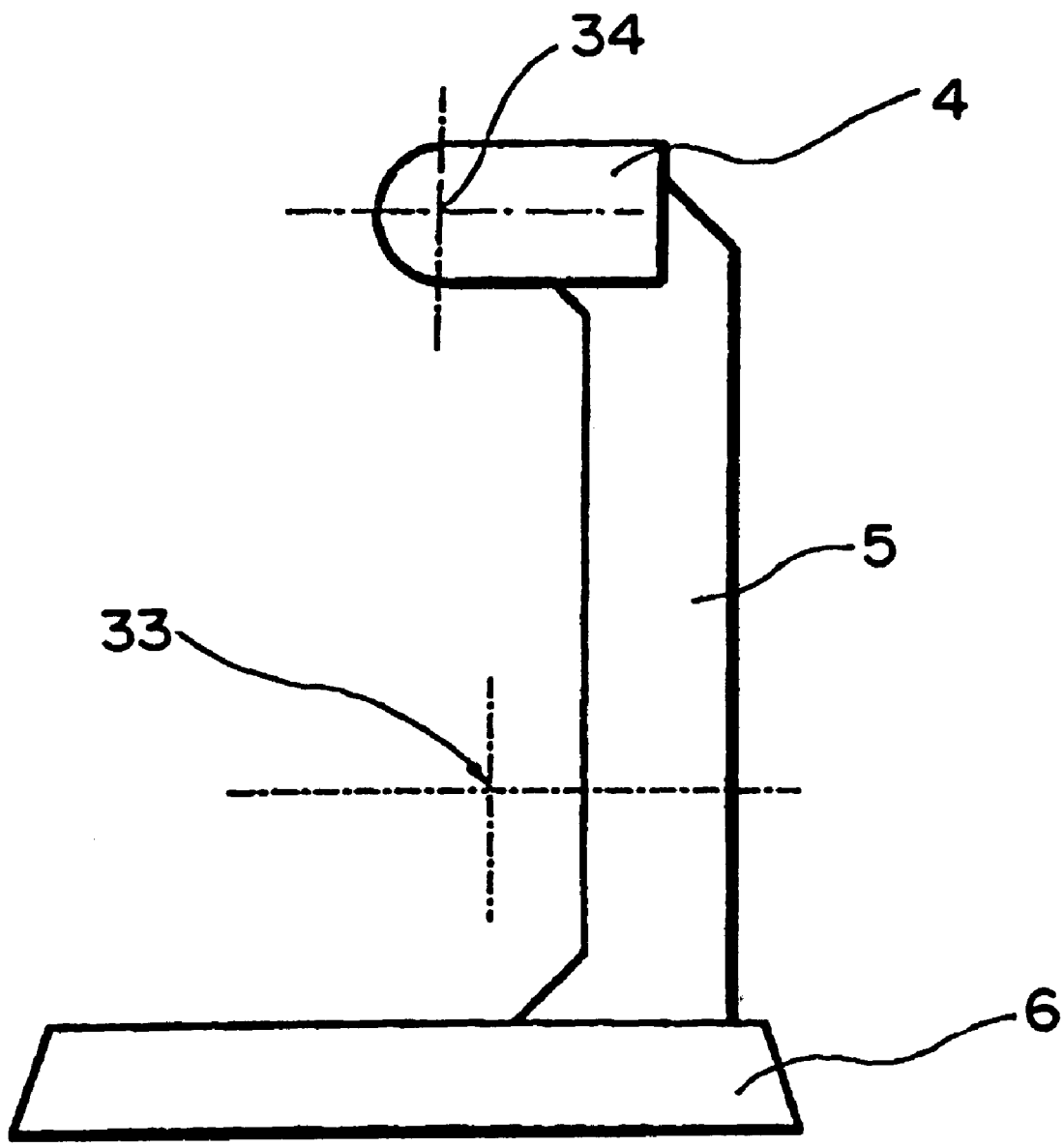
FIG. 45 is a side view of a support structure alone.

The support structure 3 includes a support base 6 and a stand support 5 turnably secured to the support base 6 so as to be turnable laterally at an arbitrary angle within a prescribed range. At an upper end of the stand support 5, a display attachment member 4 for supporting the display unit 2 thereon is laterally mounted. The support structure 3 is designed to have a gravity center 33 which is deviated backward in a horizontal direction than the rotation or tilting center (pivot) 34 in a state not mounted with the display unit 2 as shown in FIG. 45 and have a gravity center shifted and deviated horizontally forward than the pivot 34 when mounted with the display apparatus 2. Further, as will be described later, the support structure 3 is designed to obviate unnecessary electromagnetic radiation from the display unit.

The support structure 3 in this embodiment is effective for avoiding the electromagnetic wave resonance, because the stand support 5 is formed by using an insulating material. The performance thereof may be evaluated in the following manner.

A color ferroelectric liquid crystal display unit 2 driven at a maximum,clock pulse frequency of 20 MHz is mounted on such a support structure 3 provided with an anti-resonance measure regarding radiation interference wave (specific embodiments 1–3 described later) and a support structure provided with no anti-resonance measure (comparative example) and driven in an open cite, while the level of radiation interference wave is measured by an antenna standing at a point 10 m distant from the display apparatus.

Figure 49:
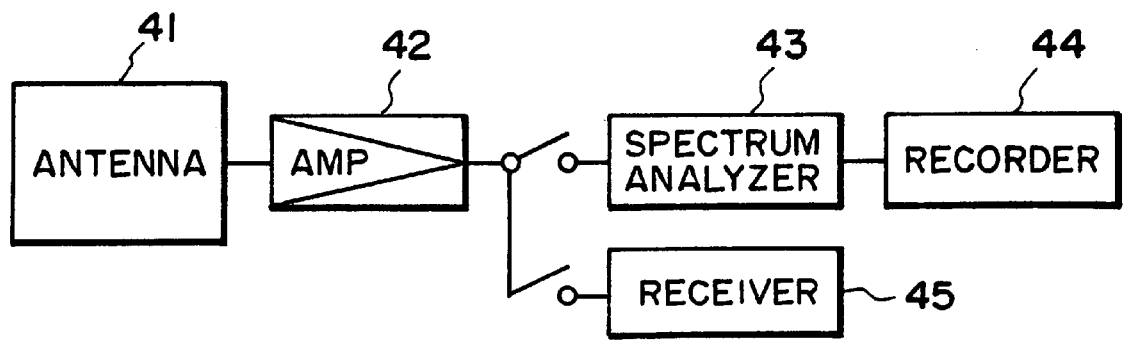
FIG. 49 is a block diagram of an instrument for measuring an electromagnetic field intensity.

The measurement apparatus may have an organization as shown in FIG. 49 including an antenna for receiving radiation interference wave from the display unit 2, an amplifier 42 for amplifying the received signal, a spectrum analyzer 43 for indicating amplitudes of respective frequency components so as to effectively observe harmonic distortion, a recorder 44 for recording the overall frequency distribution of the radiation interference wave swept by the spectrum analyzer 43, and a receiver 45 disposed in parallel with the spectrum analyzer 43 and the recorder 44 for measuring the level of the radiation interference wave at a specific frequency.

The antenna 41 may include a biconical antenna for a region of 30 MHz–300 MHz and a logperiodic antenna for a higher frequency.

The measurement may be performed as follows. The radiation interference wave received by the antenna 41 is swept for the entire wavelength region by the spectrum analyzer 42 to record the entire state of the radiation interference wave by the recorder. Then, for a specific frequency component, the level of the radiation interference wave is again accurately measured by the receiver 44 to examine whether the level is within a specified limit or not.

Figure 47:
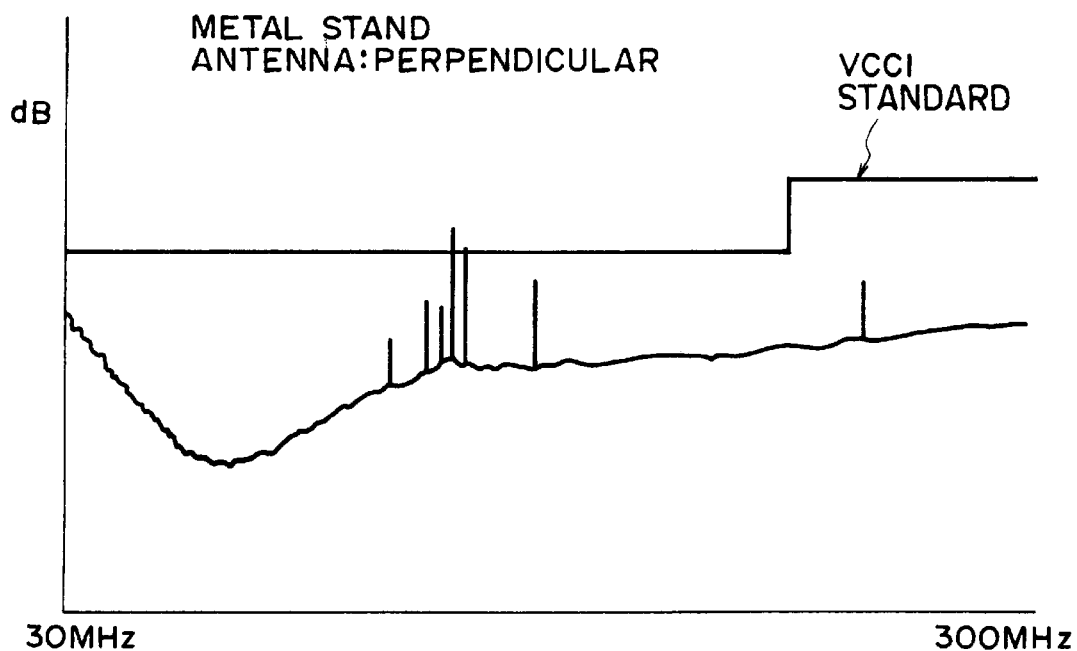
FIGS. 47 and 48 show measured electromagnetic intensity distributions in cases where a counter-measure for preventing resonance with obstructing radiation is not taken and is taken, respectively.
Figure 48:
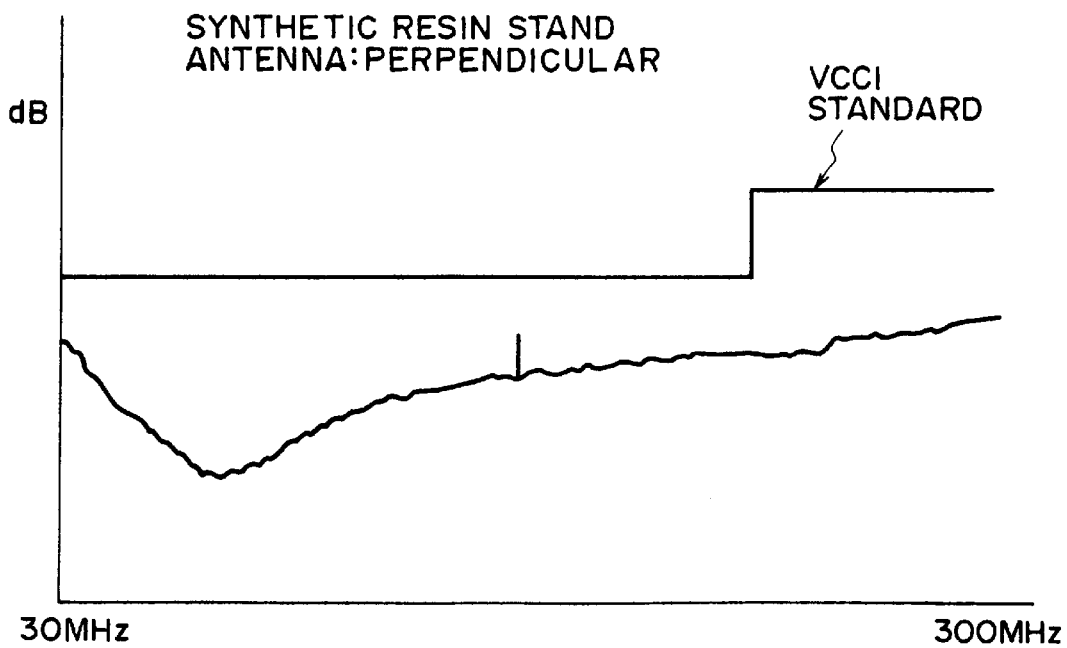

As a result of an actual comparative measurement in the above-described manner, the apparatus using the support structure with no anti-resonance measure (comparative example) provided an electromagnetic intensity distribution of vertical polarized plane wave as shown in FIG. 47, whereas the apparatus using the support structure of the embodiment provided with the anti-resonance measure provided a result shown in FIG. 48 (specific embodiment 1).

As shown in FIGS. 47 and 48, the support structure with no anti-resonance measure caused radiation interference waves exceeding the VCCI level at some frequencies (FIG. 47), but the support structure 3 of this embodiment resulted in no radiation interference wave exceeding the level of the VCCI standard at any frequencies (FIG. 48).

Figure 3:
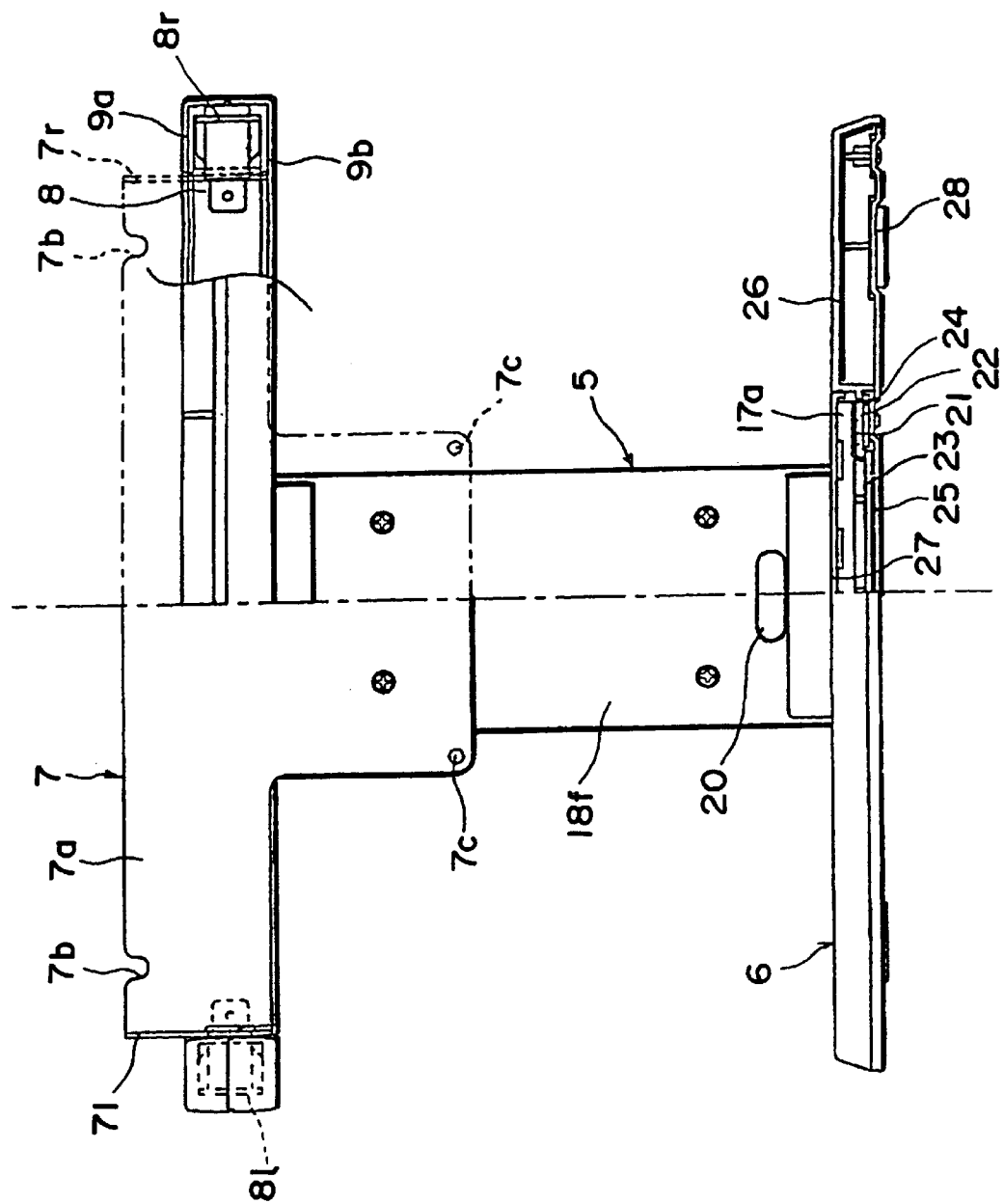
FIGS. 3, 4 and 5 are a front view, a side view and a plan view, perspectively, of the support structure.
Figure 4:
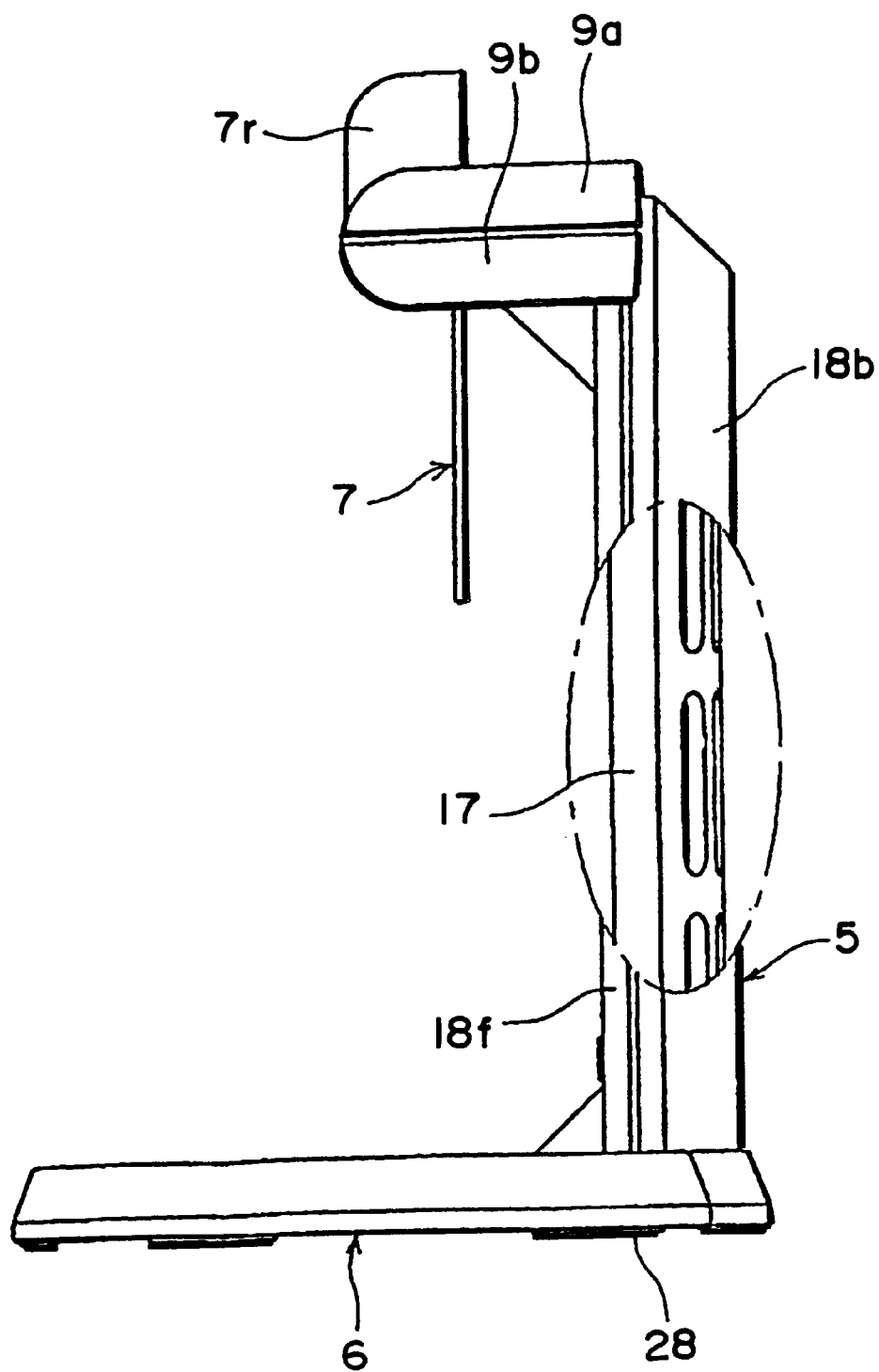

In a specific embodiment 1, a support structure 3 as shown in FIG. 3 was formed by supporting an insulating stand support 5 by a support base 6 and laterally mounting a display attachment member 4 at the upper end of the standard support. As a result of measurement by mounting a ferroelectric liquid crystal display apparatus, the support structure provided a result satisfying the VCCI standard as shown in FIG. 48 while having satisfactory mechanical strength and production cost.

In a specific embodiment 2, the support arm 8 of the lateral attachment member was formed of an insulating synthetic resin. This type of support structure was satisfactory in respect of the VCCI standard, but the support arm showed a lower mechanical strength.

In a specific embodiment 3, the display attachment member 4 and the stand support 5 were connected via an electrically insulating member. As a result, the radiation interference waves showed a somewhat higher level than in the above embodiments 1 and 2 but satisfied the VCCI standard over the entire frequency region.

In a comparative example giving the result of FIG. 47, the support stand 5 and the lateral attachment member 4 were both formed of metal. The support structure provided satisfactory mechanical strength and production cost, but the radiation interference wave exceeded the VCCI level.

The above-described measurement was performed in an environment of 23° C. by using a drive voltage of 20 volts and a frame frequency of ca. 15 Hz for repetitively displaying an "H" pattern as ordinarily used in radiation interference measurement.

As shown above, when the support structure 3 is constituted by selecting component materials therefor, it has become possible to obviate a resonance of the support structure 3 with radiation interference waves issued from a liquid crystal display drive circuit in a display unit 2 (or with an electromagnetic wave of a particular frequency entering from outside). A support structure composed of a metal material may generally cause induced radiation with radiation interference waves, and a support structure having an antenna structure may amplify the radiation interference waves and electromagnetic waves of a particular frequency entering the support structure.

In contrast thereto, by constituting a support structure 3 by using a member comprising an insulating material as in the above-described specific embodiments 1–3, it is possible to obviate the amplification of radiation interference waves or electromagnetic waves at a specific frequency, thus obtaining a result below the VCCI level.

<Display Attachment Member>

Next, the display attachment member 4 in the support structure will be described.

Figure 18:
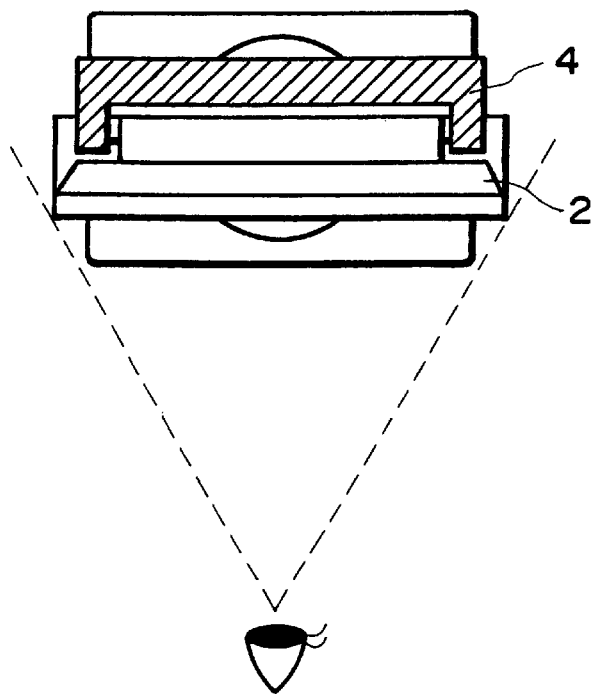
FIGS. 18A and 18B are a schematic plan view and a schematic side view, respectively, of a combination of a display unit and a support structure for illustrating a relationship.
Figure 18:
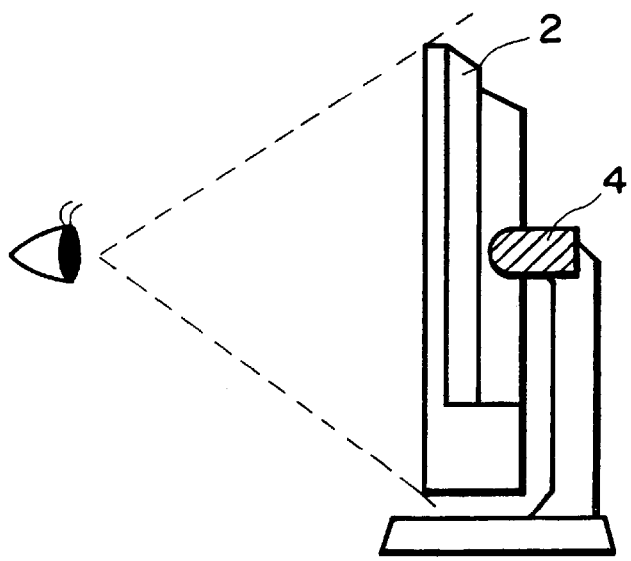
Figure 19:
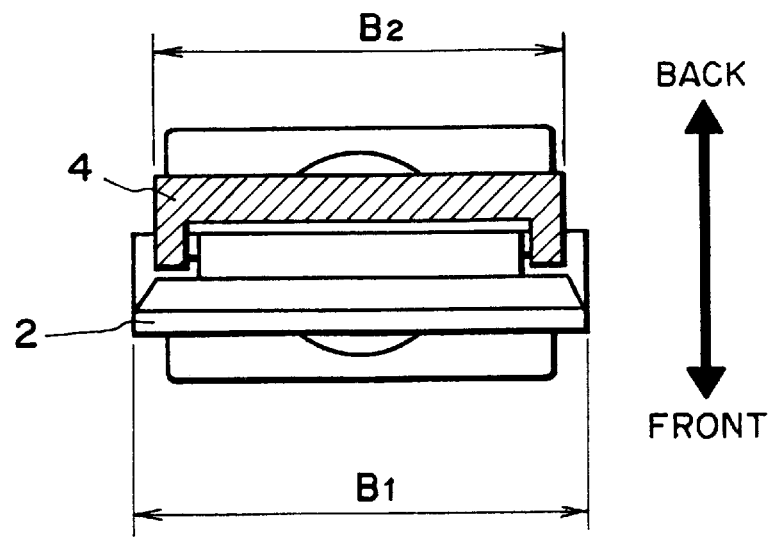
FIGS. 19A and 19B are a schematic plan view and a schematic side view, respectively, of a combination of a display unit and a support structure for illustrating a size relationship.
Figure 19:
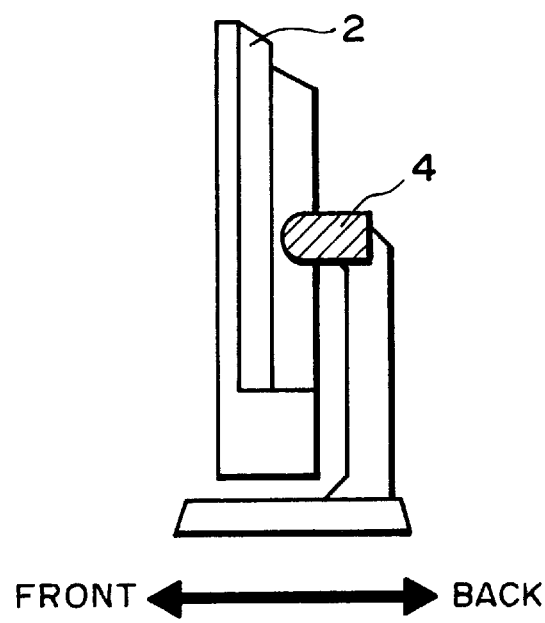

As shown in FIGS. 2 to 5, the display attachment member 4 in FIG. 1 includes a tilting member (display holder) 7 having a planar shape of "U", a support body disposed outside and parallely with the display holder 7, and a resistance force-adjusting mechanism (tilting mechanism) 10r and 10l for tilting the display holder 7 with respect to the support body. The display attachment member 4 is designed to have a lateral width B2 which is narrower than a lateral width B1 of the display unit 2 (FIG. 19A) and a vertical length smaller than that of the display unit 2, so that the attachment member 4 is not observable when the display picture is viewed from the front of the display unit 2 (FIGS. 18A and 18B). In other words, the display attachment member 4 is disposed within a whole projection area of the display unit 2.

The display holder 7 comprises a metal member of, e.g., stainless steel for supporting the display unit (FIGS. 1A–1C). As shown in FIG. 3, the display holder 7 is formed by leaving an intermediate portion 7a thereof so as to be disposed along the back of the display unit 2 and bending both side end portions to be opposite to the sides of the display unit 2 to form axis supporting parts 7r and 7l. At upper edge portions of the intermediate portion 7a, engagement recesses 7b for engagement with projecting pins 202g projecting out of the back of the display unit 2 (FIG. 27) are formed. At lower portions of the intermediate member 7a, screw holes 7c for screwing the display holder 7 to the back of the display unit 2 are provided.

Figure 5:
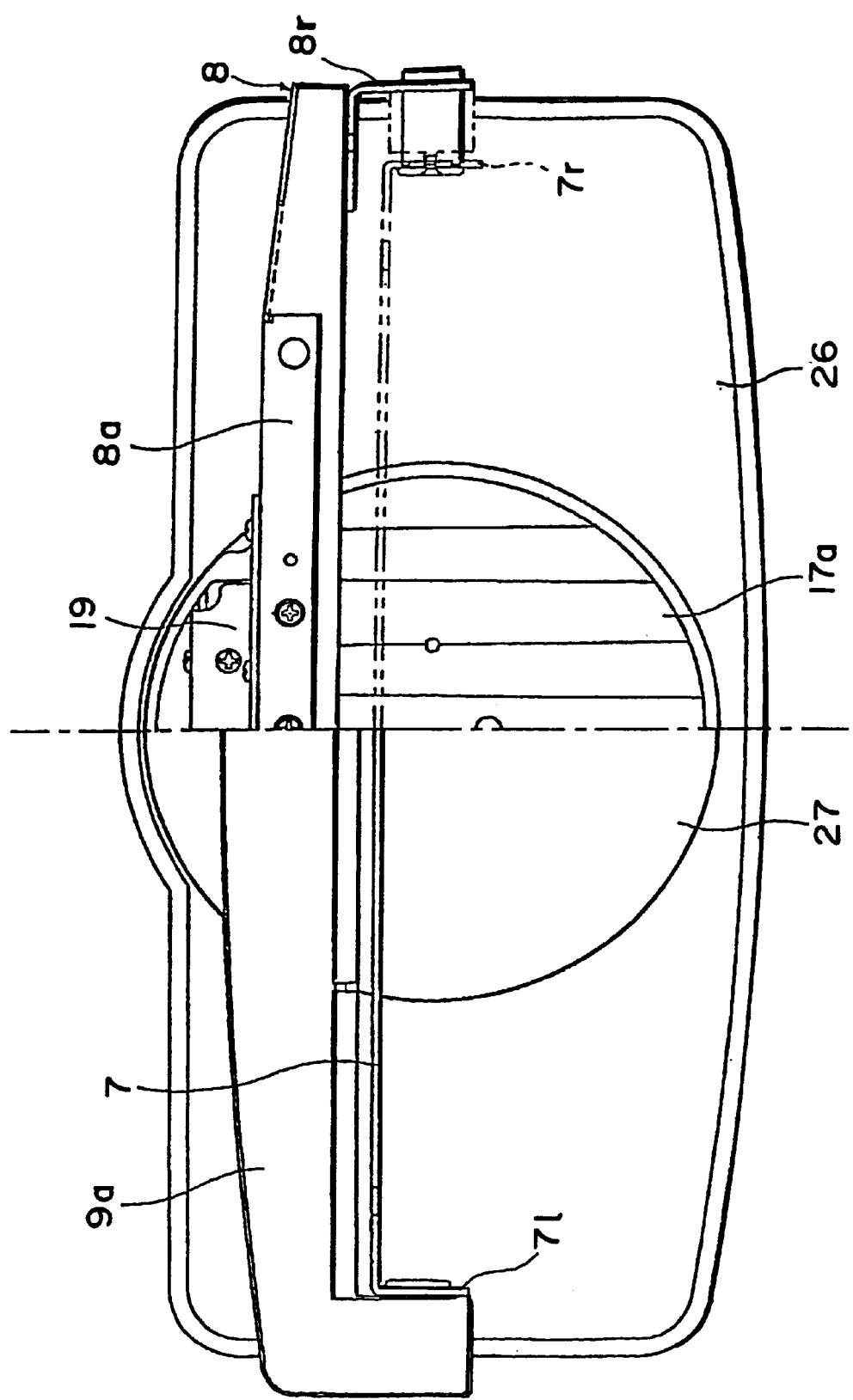

The above-mentioned support body is formed by a support arm 8 and upper and lower arm covers 9a and 9b for covering the support arm 8 from above and below the arm 8. The upper and lower arm covers 9a and 9b may be formed of a synthetic resin material, such as an acrylonitrile-styrene-butadiene copolymer (ABS). The support arm 8 is formed to have a coupling portion or member 8a longer than the intermediate portion 7a of the display holder 7 and, at both lateral ends thereof, brackets 8r and 8l are formed integrally so as to be opposite to the axis supporting parts 7r and 7l as shown in FIG. 5.

As shown in FIG. 3, at the left and right ends respectively, the tilting mechanisms 10r and 10l are fitted between the axis supporting parts 7r, 7l of the display holder 7 and the brackets 8r, 8l of the support arm 8.

Figure 26:
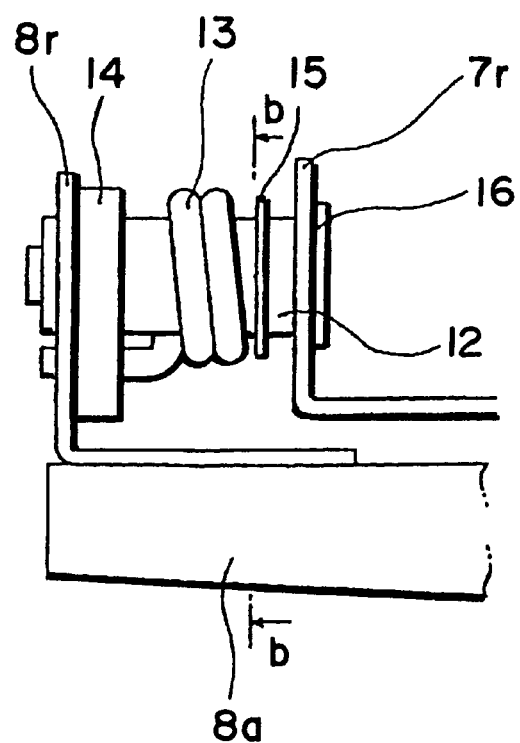
FIG. 26A is a partial plan view showing a tilting mechanism.
FIG. 26B is a sectional view taken along a line b—b in FIG. 26A.
Figure 26:
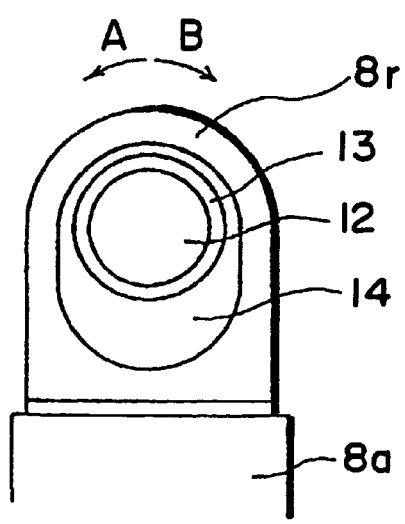

As shown in FIG. 26(a), the right and left tilting mechanisms 10r and 10l respectively include a laterally disposed axis member 12, a locked spring 13, and a bearing 14 holding one end of the locked spring 13 and also functioning as a rotation stopper, so that the locked springs 13 at both ends are disposed to have an identical winding direction. Further, as shown in FIGS. 10–17, the rotation or tilting center (pivot) of the axis member 12 is designed to be at a position shifted horizontally backward from the gravity center of the display apparatus when the display unit 2 is mounted. The home position (normal position) of the display unit may be arbitrarily set to a position with an inclination at an arbitrary angle within a prescribed angle range or a vertical position.

The locked spring 13 is formed to have an inner diameter smaller than the outer diameter of the axis member 12, and one end thereof extends through the stopper and bearing 14 to be engaged with the bracket 8r or 8l. The other end of the locked spring 13 is made free whereas the elongation of the spring 13 is suppressed by a spring holder 15 through which the axis member 12 is inserted. The inner end of the axis member 12 is integrally screwed to the axis supporting port 7r (or 7l) via a washer 16, and the outer end thereof is rotatably supported by the stopper bearing 14 and the bracket 8r (or 8l). The locked spring 13 is wound about the axis member 12 so that its inner diameter is enlarged when the display holder 7 is turned upward (in an arrow A direction in FIG. 26B) and the inner diameter is decreased when the display holder is turned downward (in an arrow B direction in FIG. 26B).

Accordingly, the turning or tilting direction of the tilting mechanisms is downward in case where the movement of the display unit 2 coincides with the direction of a torque WX about the axis member 12 caused by a weight W of the display unit and a bias X between the gravity center of the display unit 2 and the rotation center, and upward in the opposite direction. According to this definition, the tilting mechanisms 10r and 10l are designed to generate a resisting downward torque $Tr_1$ which is exerted by the tilting mechanisms in resistance to an operation for turning the display unit upward by an arbitrary angle within a prescribed range, which torque $Tr_1$ is smaller than an upward torque $Tr_2$ which is exerted by the tilting mechanisms in response to an operation for turning the display unit downward by an arbitrary angle within a prescribed range. As a result, the difference in operation force between the upward tilting and downward tilting of the display unit is reduced to alleviate an uneasy touch in the tilting operation. Moreover, the difference $\Delta T (=Tr_2-Tr_1)$ between the upward torque $Tr_2$ and the downward torque $Tr_1$ may be set depending on the torque WX caused by the own eight of the display unit 2. As a result, it is possible to make substantially equal the operation forces for the upward tilting and the downward tilting operation. The torque difference $\Delta T$ may be given by a combination of the right and left tilting mechanisms.

More specifically, the torque difference $\Delta T$ may be generated by a difference in direction of rotation of the axis member relative to the winding direction of the locked spring in the tilting mechanism as a resistance force-adjusting mechanism. As a specific structure, a locked spring is fitted about the outer periphery of an axis member so as to lock its one end at the axis member. When the axis member is relatively rotated or turned in a direction identical to the winding direction of the locked spring, the diameter of the locked spring is reduced to provide an increased frictional force between the members. On the other hand, when the axis member is relatively rotated in a direction opposite to the winding direction of the locked spring, the diameter of the locked spring is enlarged to reduce the frictional force acting between the members.

Based on this principle, such a resistance force adjusting mechanism comprising a combination of a locked spring and an axis member is provided to the left and right ends of the tilting member while adjusting the winding directions of the locked springs at both ends. Each of the left and right resistance-force adjusting mechanisms can generate a torque difference $\Delta T$ so that the load of one mechanism can be reduced, and the tilting operation of the body to be supported can be smoothly performed.

Incidentally, by providing an engageable member onto a back of a display unit as a body to be supported and an engaging member to a tilting member as a display holder on the support structure side, the display unit can be easily mounted on and detached from the support structure. Further, as the tilting mechanism is provided to the support structure side, the display unit need not be provided with a special mechanism for realizing a tilting operation but can be tilted by simply mounting it on the support structure.

Figure 20:
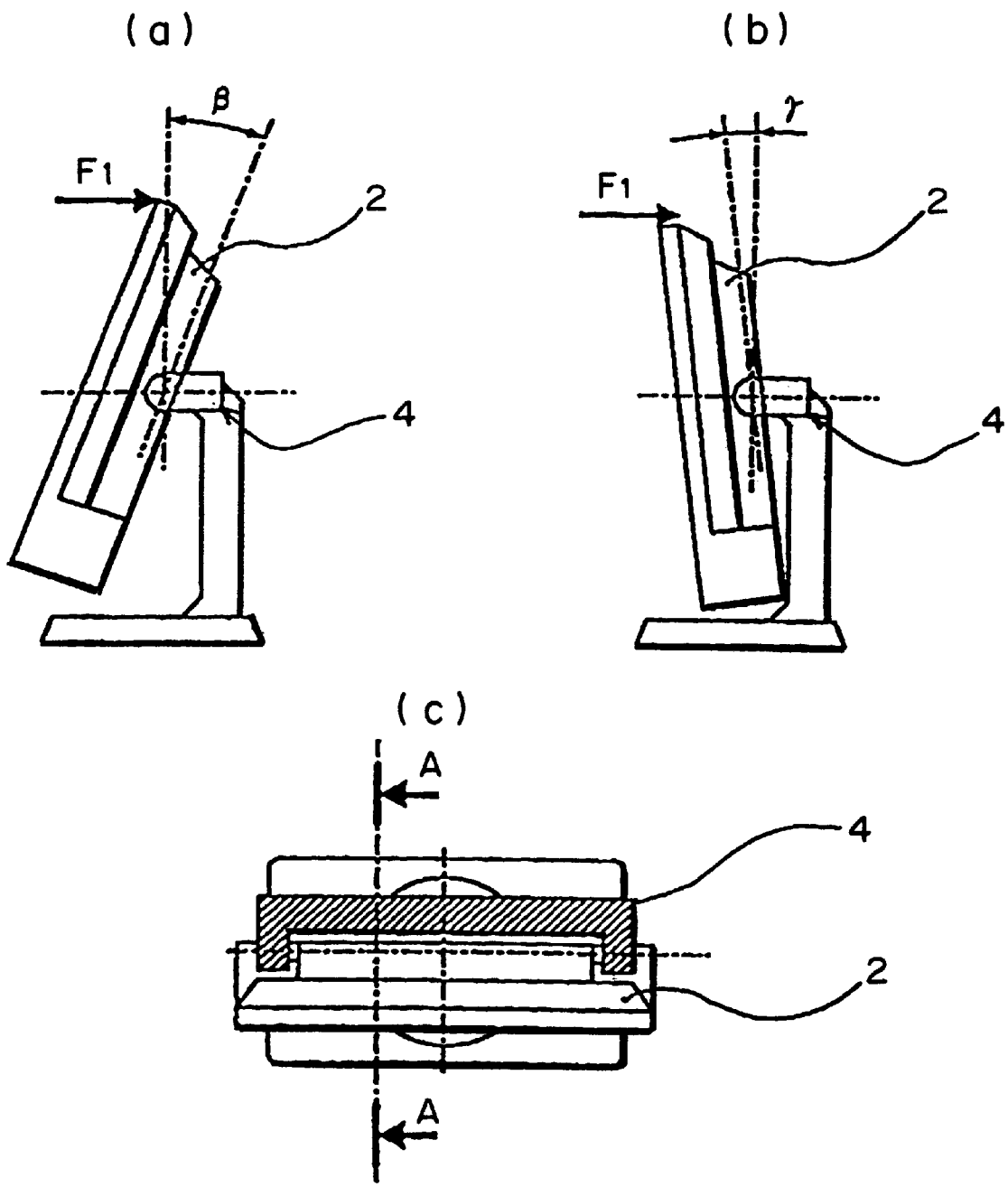
FIGS. 20A–20C are illustrations of a display apparatus due an up-and-down movement including FIG. 20A showing an upwardly inclinable range, FIG. 20B showing a downwardly inclinable range and FIG. 20C showing a home position, respectively, of a splay unit.

The display unit 2 is designed to be tiltable by a prescribed angle β in the upward direction (FIG. 20(a)) and by a prescribed angle γ in the downward direction (FIG. 20(b)). In order to allow the upward tilt of angle β and the downward tilt of angle γ as described above, the coupling member 8a (or 8b) may be disposed at a position determined by the following formulae (1) and (2).

Figure 21:
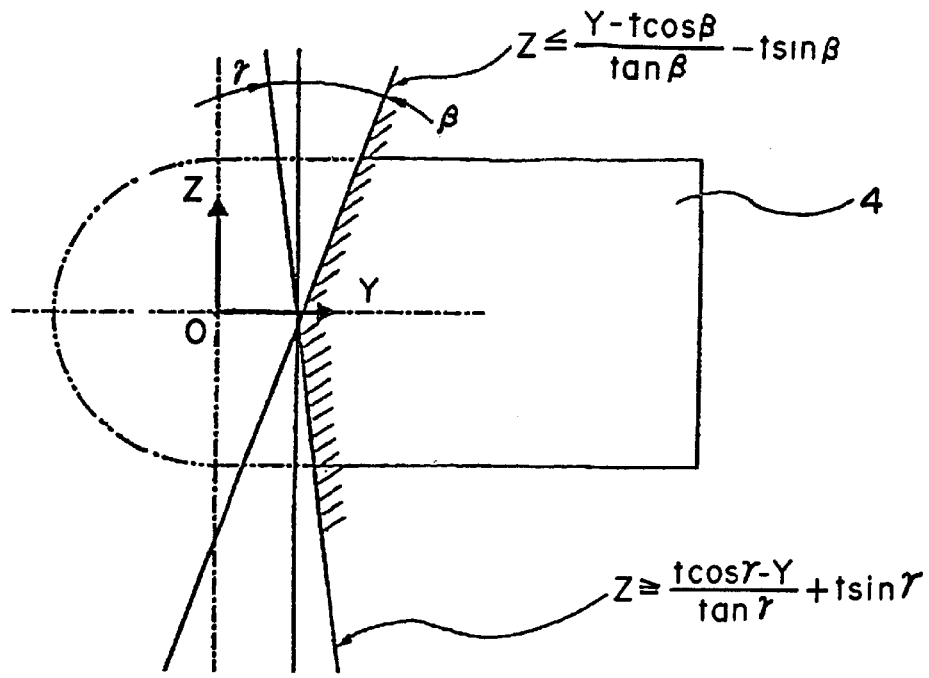
FIG. 21 is an illustration of an inclinable range of a section taken along a line A—A in FIG. 20C.

More specifically, as shown in FIG. 21 which is a sectional view taken along a line A—A in FIG. 20(c), the position of the axis member 12 is taken as the origin, the forward-backward direction is taken on a Y-axis and the vertical direction is taken on a Z-axis to define a Y-Z coordinate system. Then, the upward and downward tiltable angles of the display panel of the display unit 2 are denoted by β and γ, respectively, and the distance between the rear surface of the display unit 2 and the axis member 12 in the horizontal direction is denoted by t. Then, the upward tiltable angle β is given by:

$$Z \leq \{(Y-t\cos\beta)/\tan\beta\} - t\sin\beta \qquad (1),$$

and the downward tiltable angle γ is given by:

$$Z \geq \{(t\cos\gamma-Y)/\tan\gamma\} + t\sin\gamma \qquad (2).$$

More specifically, the upward tiltable angle β may be set at 20 deg., and the downward tiltable angle γ may be set at 5 deg. Based on the above formulae (1) and (2), it is possible to determine the allowable maximum size and strength of the support arm 8 and the upper and lower arm covers 9a and 9b for storing the tilting mechanisms 10r and 10l.

In order to regulate the upward tilt angle β and the downward tilt angle γ respectively, it is also possible to provide a stopper to the support structure body. The formulae (1) and (2) further define a tilted state and provide Y>t when β=0 or γ=0.

In the state where no operational force for changing the tilt angle is applied to the display unit 2 and the display unit 2 is in its home position, the tilting mechanisms 10r and 10l are designed so that the own weight W of the display unit 2 causes a torque about the axis member 12 due to a forward bias of the gravity center acting in a direction of tightly winding the locked spring 13 to reduce the inner diameter of the spring 13, thereby tightly holding the axis member 12.

Figure 6:
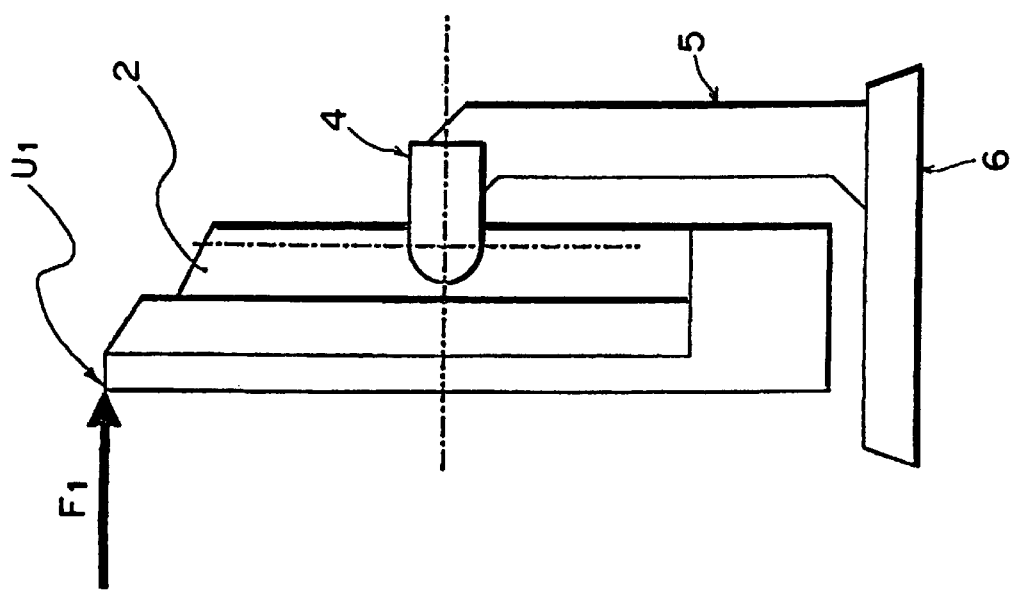
Figure 10:
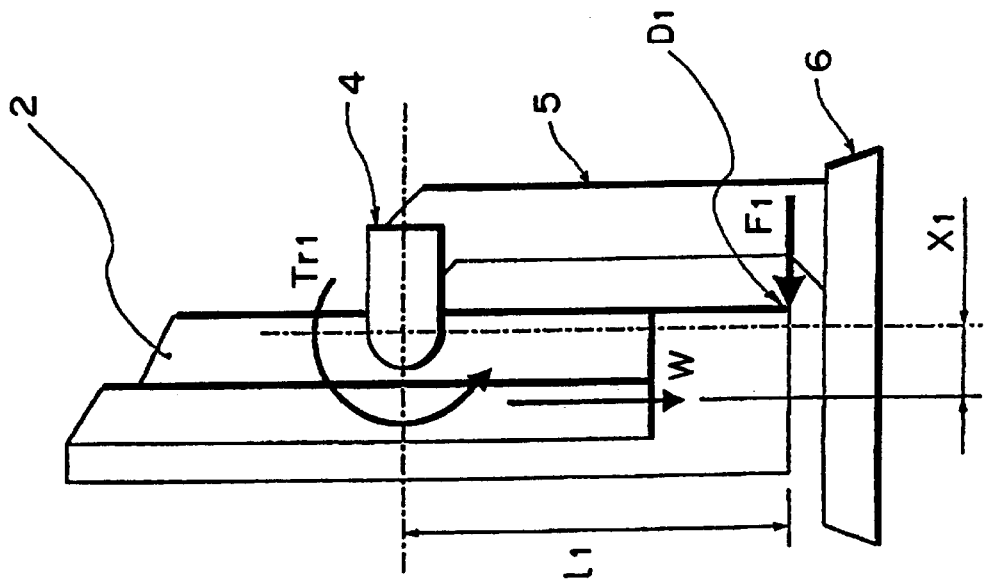
FIGS. 10–13 are respectively a schematic side view of a display apparatus for illustrating an operation when an operation force is applied to an indicated application point (corresponding to those shown in FIGS. 6–9, respectively).

Referring to FIG. 6, when an upper application point $U_1$ of the display unit 2 placed in its vertical home position is pushed at an operation force $F_1$ exceeding a prescribed value to tilt the display unit 2 upwards, the tilting mechanisms 10r and 10l are so designed that the axis member 12 is turned via the display holder 7 relative to the locked spring 13, thereby enlarging the inner diameter of the locked spring 13 to reduce the pressure contact force acting onto the axis member 12. As a result, when the display unit 2 is tilted or turned upward, the downward resisting torque $Tr_1$ is reduced to relatively increase the upward tilting operational force $F_1$ than the downward resisting torque $Tr_1$ and the downward torque WX due to the own weight of the display unit 2, thereby facilitating the upward turning or tilting of the display holder 7 (FIG. 10).

Figure 7:
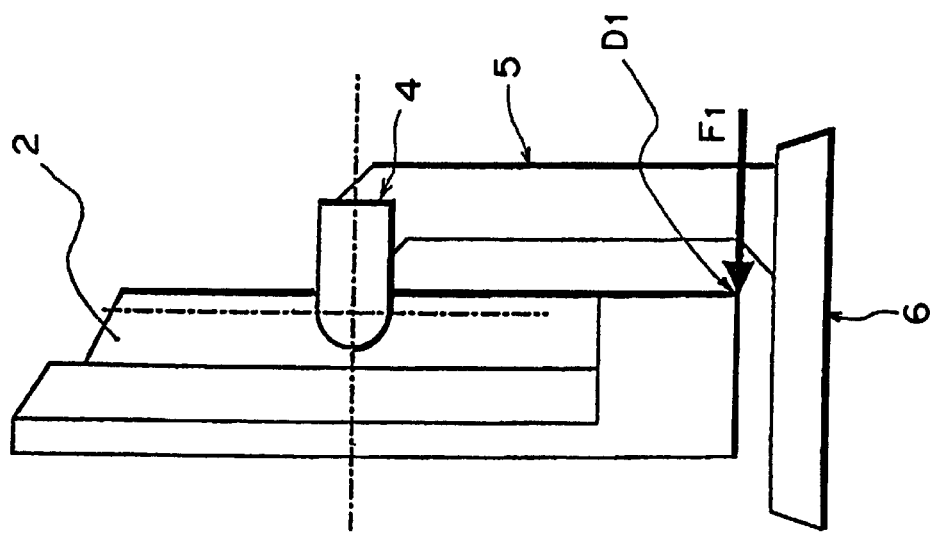
FIGS. 6 and 7 are schematic side views showing points of application at an upper end and a lower end, respectively, a display unit mounted on a support structure according to the first embodiment.
Figure 11:
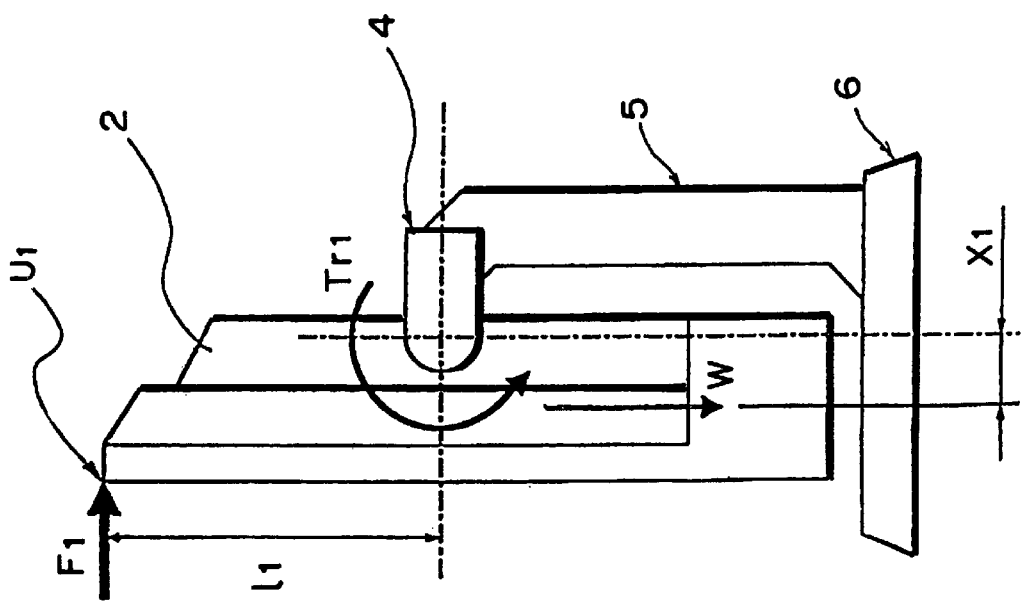

Similarly, referring to FIG. 7, when a lower application point $D_1$ of the display unit 2 placed in its vertical home position is pushed at an operation force $F_1$ exceeding a prescribed value to tilt the display unit 2 upwards, the tilting mechanisms 10r and 10l are so designed that the axis member 12 is turned via the display holder 7 relative to the locked spring 13, thereby enlarging the inner diameter of the locked spring 13 to reduce the pressure contact force acting onto the axis member 12. As a result, when the display unit 2 is tilted or turned upward, the downward resisting torque $Tr_1$ is reduced to relatively increase the upward tilting operational force $F_1$ than the downward resisting torque $Tr_1$ and the downward torque WX due to the own weight of the display unit 2, thereby facilitating the upward turning or tilting of the display holder 7 (FIG. 11).

Figure 46:
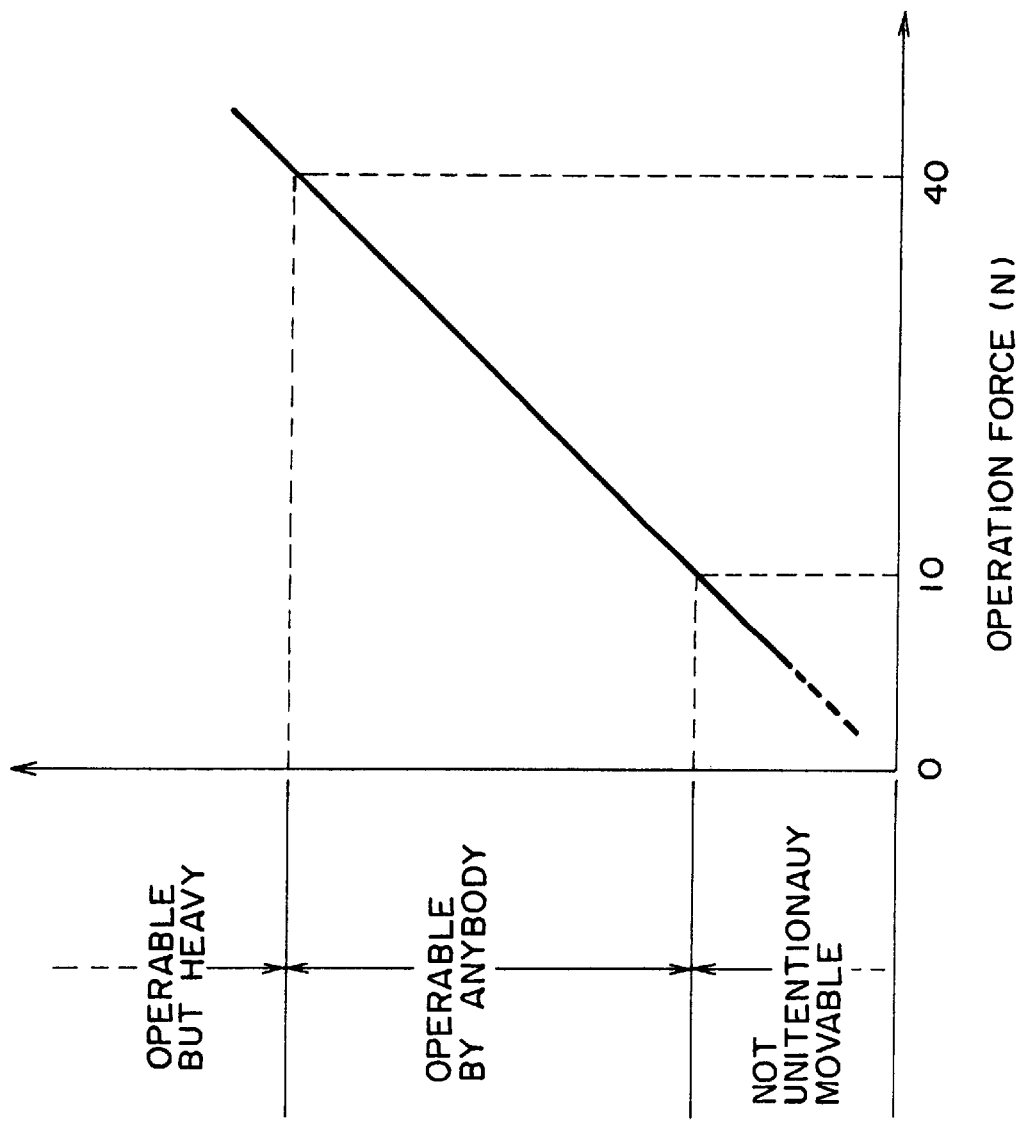
FIG. 46 is a view for illustrating a set range for operation force.

In this instance, if too large an operational force $F_1$ is required as shown in FIG. 46, the upward turning of the display unit 2 becomes difficult by a human force, so that the upper limit of $F_1$ may be set, e.g., to 40 N (Newton) as a range of force readily exertable as a human force. On the other hand, if operational force $F_1$ is too small, the display unit 2 is turnable at an unintentionally applied force, so that the lower limit of $F_1$ may be set, e.g., to 10 N.

On the other hand, the downward torque $Tr_1$ occurring at the time of enlarging the locked spring 13 and the vertical length $l_1$ from the axis member 12 to the action point $U_1$ ($D_1$) are determined values, and the operational force $F_1$ is set within a prescribed range, so that the bias length (deviation) $X_1$ from the axis member 12 to the gravity center of the display unit 2 may be determined by the following equation (3):

$$X_1 = (F_1 l_1 - Tr_1)/W \tag{3}$$

As a more general consideration, the display unit 2 is not necessarily in a vertical position. In case where the axis member 12 is at a backwardly deviated position relative to the gravity center at any tilting state of the display unit 2, the following equation (4) is given:

$$F_1 = \{Tr_1 + W(X \cos \alpha + l_2 \sin \alpha)\}/(l_1 \cos \alpha + X_3 \sin \alpha) \tag{4}$$

wherein $l_2$ denotes a vertical length between the axis member 12 and the gravity center of the display unit 2;

$X_3$ denotes a deviation between the axis member 12 and the application point $U_1$ (or $D_1$); and α: a turning angle of the display unit 2 in upward and downward directions (the sign is taken as positive for an upward turning).

In this instance, the operational force $F_1$ for turning or tilting the display unit 2 may preferably be set within the range of $10 \leq F_1 \leq 40$. Thus, the display unit can be tilted at a moderate operation force while obviating an unintentional movement at a small force.

Figure 8:
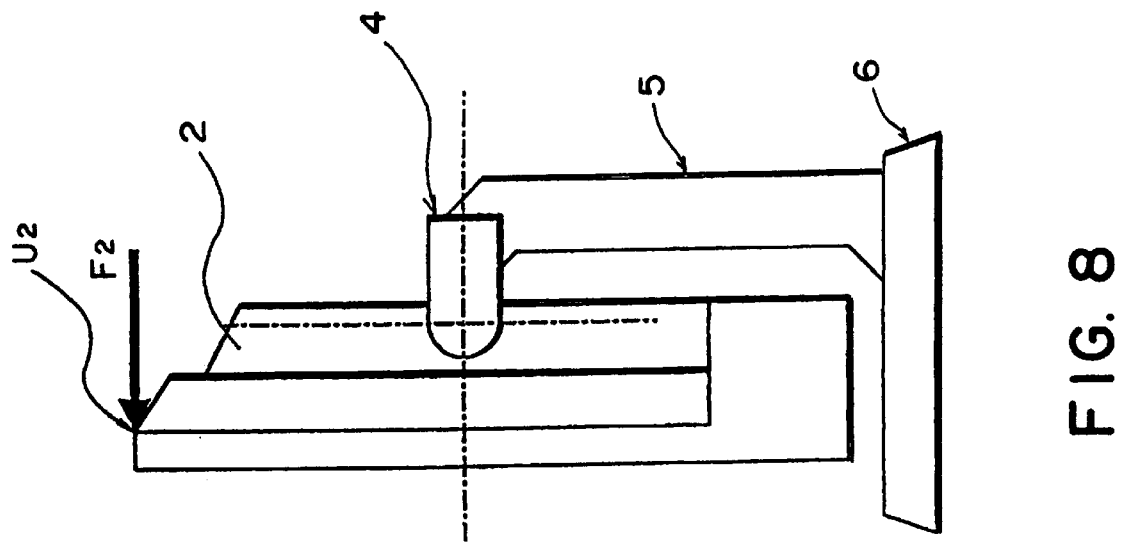
Figure 12:
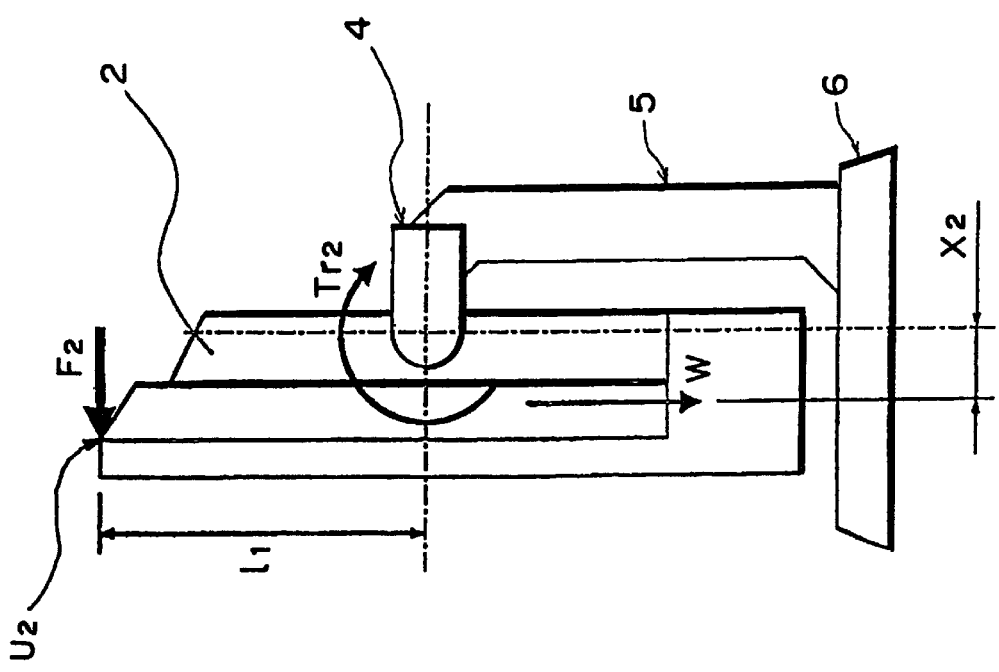

As a further consideration, referring to FIG. 8, when an upper application point $U_2$ of the display unit 2 placed in its vertical home position is pushed at an operation force $F_2$ exceeding a prescribed value to tilt the display unit 2 downwards, the tilting mechanisms 10r and 10l are so designed that the axis member 12 is turned via the display holder 7 relative to the locked spring 13, thereby reducing the inner diameter of the locked spring 13 to increase the pressure contact force and frictional force acting onto the axis member 12. However, as the moment based on the own weight of the display unit 2 is added to the operation force $F_2$ to exceed the upward resisting torque $Tr_2$, the display unit 2 can be turned downward (FIG. 12).

Figure 9:
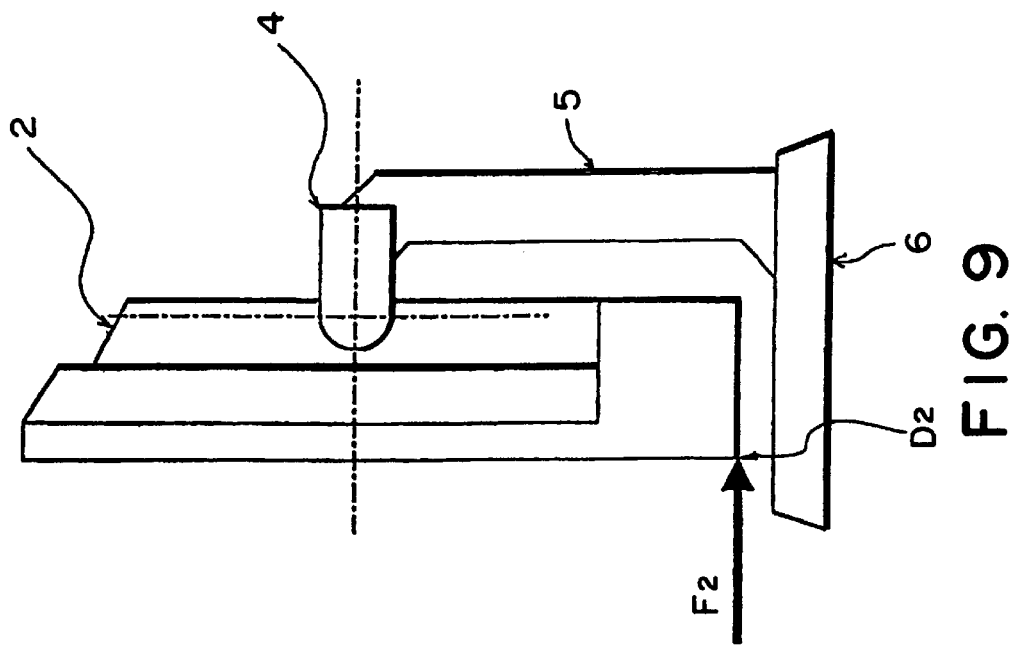
FIGS. 8 and 9 are schematic side views showing points of application at an upper end and a lower end, respectively, of a display unit mounted on a support structure.
Figure 13:
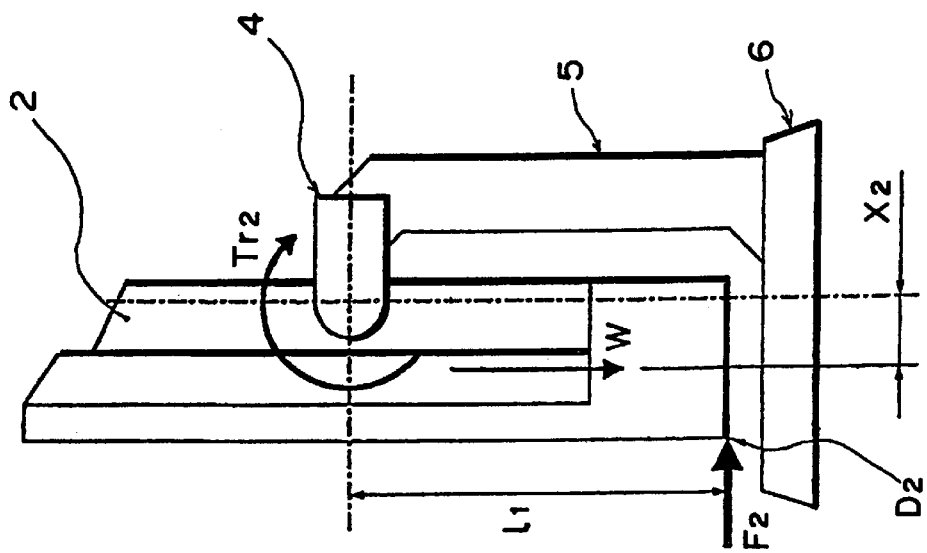

Similarly, referring to FIG. 9, when a lower application point $D_2$ of the display unit 2 placed in its vertical home position is pushed at an operation force $F_2$ exceeding a prescribed value to tilt the display unit 2 downwards, the tilting mechanisms 10r and 10l are so designed that the axis member 12 is turned via the display holder 7 relative to the locked spring 13, thereby reducing the inner diameter of the locked spring 13 to increase the pressure contact force and frictional force acting onto the axis member 12. However, as the moment based on the own weight of the display unit 2 is added to the operation $F_2$ to exceed the upward resisting torque $Tr_2$, the display unit 2 can be turned downward (FIG. 13).

In this instance, if too large an operational force $F_2$ is required as shown in FIG. 46, the downward turning of the display unit 2 becomes difficult by a human force, so that the upper limit of $F_2$ may be set to 40 N (Newton) as a range of force readily exertable as a human force. On the other hand, if operational force $F_2$ is too small, the display unit 2 is turnable at an unintentionally applied force, so that the lower limit of $F_2$ may be set to 10 N.

On the other hand, the upward torque $Tr_1$ occurring at the time of reducing the diameter of the locked spring 13 and the vertical length $l_1$ from the axis member 12 to the application point $U_1$ ($D_1$) are determined values, and the operational force $F_2$ is set within a prescribed range, so that the bias length (deviation) $X_1$ from the axis member 12 to the gravity center of the display unit 2 may be determined by the following equation (5):

$$X_2 = (Tr_2 - F_2 l_1)/W \tag{5}$$

By setting the bias length X to a smaller one of $X_1$ and $X_2$, it is possible to prevent an unnecessarily large increase of torque WX due to the own weight.

As a more general consideration, the display unit 2 is not necessarily in a vertical position. In case where the axis member 12 is at a backwardly deviated position relative to the gravity center at any tilting state of the display unit 2, the following equation (6) is given:

$$F_2 = \{Tr_2 + W(X \cos \alpha + l_2 \sin \alpha)\}/(l_1 \cos \alpha + X_3 \sin \alpha) \tag{6}$$

By setting the dimensions of the associated members so as to satisfy $10 \leq F_1$ and $F_2 \leq 40$ based on the equations (4) and (6), it is possible to ensure a smooth tilting operation from any (tilting) position of the display unit 2 while avoiding an unintentional movement at a small force.

<Stand Support 5>

As shown in FIGS. 2–5, the stand support 5 includes a post member 17 having a turnable base 17a at its root and a front post cover 18f and a rear post cover 18b covering the post member 17. The post member 17 may be formed from an unsaturated polyester resin compound of bulk-molding type, and the front and rear post covers 18f and 18h are formed from acrylonitrile-styrene-butadiene copolymer (ABS).

At the upper end of the post member 17, an arm support plate 19 is attached and, at a lower part of the front post cover 18f, a stopper 20 is attached so as to be abutted by the lower end of the display unit 2 when the body is tilted downward.

Figure 29:
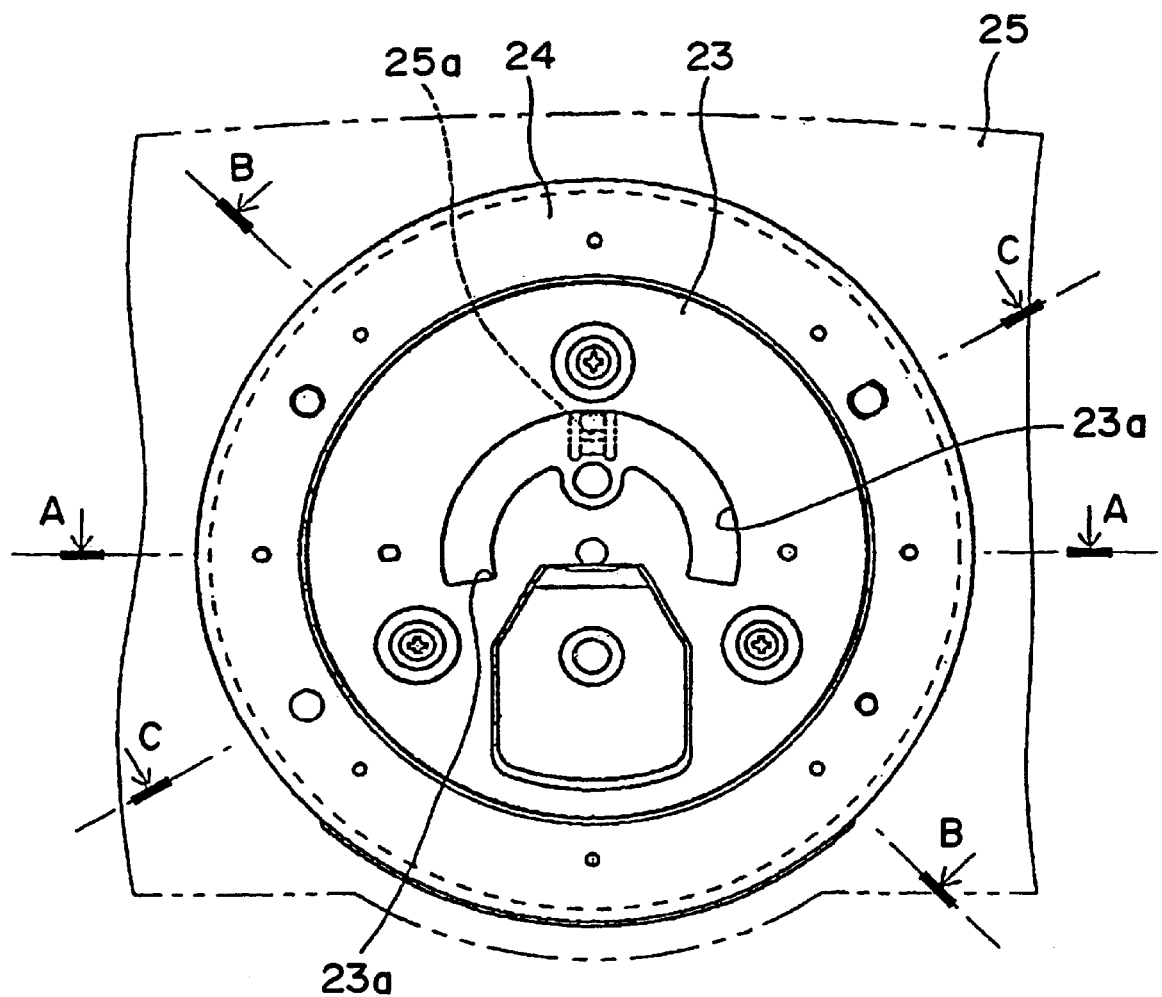
FIG. 29 is a plan view showing a post member-stopper plate.
Figure 30:
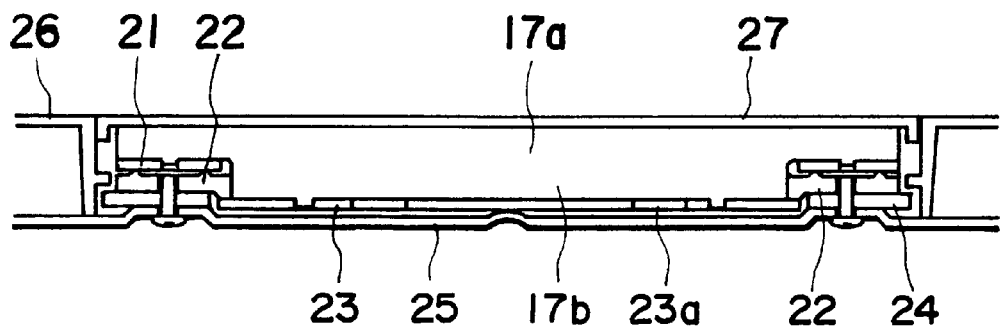
FIGS. 30–32 are sectional views taken along line A—A, line B—B and line C—C, respectively, shown in FIG. 29.
Figure 31:
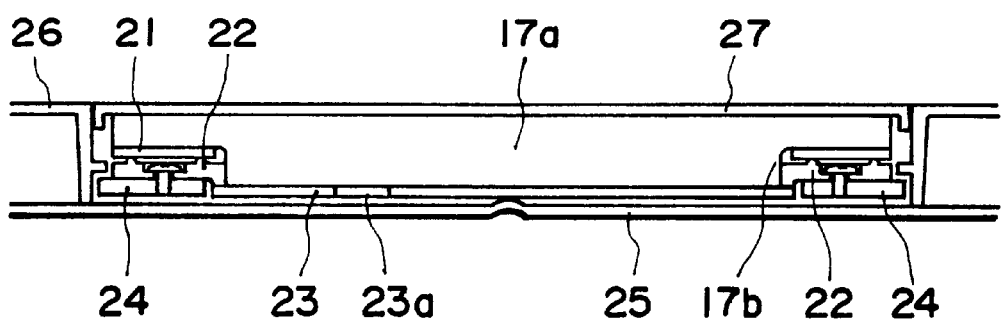
Figure 32:
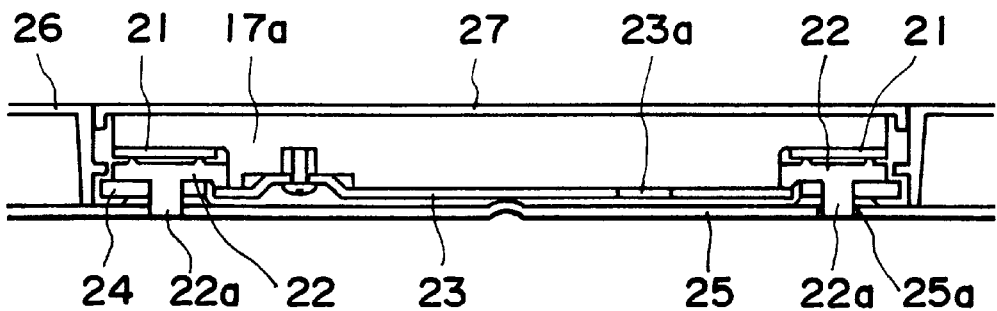

As shown in FIGS. 30–32, the lower surface of the turnable base 17a is provided with an axial projection 17b at its center and, along the periphery of the lower surface of the turnable base 17a, a fixed ring 21 of a metal, such as stainless steel, and a horizontal turn-assist ring 22 of polyacetal resin (assisting the turning of a post member-fixed plate combination) are arranged in this order. These members are pierced by the axial projection 17b. The fixed ring 21 is fixed surrounding the lower surface of the turnable base 17a. At the center of the lower surface of the turnable base 17a, a post member stopper plate 23 shown in FIG. 29 having an outer diameter slightly larger than the inner diameter of the horizontal turn-assist ring 22 as shown in FIGS. 30–32 is attached, and the horizontal turn-assist ring 22 is inserted between the post member stopper plate 23 and the fixed ring 21. The horizontal turn-assist ring 22 is fixed to an assist ring support plate 24 as shown in FIG. 31, and the horizontal turn-assist ring 22 and the ring support plate 24 are fixed to the stand base 25 as shown in FIG. 30.

The lower surface of the turn-assist ring 22 is provided with a plurality of bosses 22a as shown in FIG. 32 so as to facilitate the assemblage of the turn-assist ring 22 and the stand base 25, so that the bosses 22a are fitted into fitting holes 25b formed in the stand base 25 through the turn-assist ring support plate 24. Further, the post member stopper 23 is provided with a crescent-shaped aperture 23a as shown in FIG. 29.

In the above-described stand support 5, a turnable combination of the post member 17 and a disk-like member including the fixed ring 21 and the post member stopper plate 23, and a combination of the horizontal turn-assist ring 22, the assist ring support plate 24 and the stand base 25, are respectively integrated and separately turnable relative to the other. More specifically, a sliding surface is given between the fixed ring 21 and the horizontal turn-assist ring 22. For this reason, the horizontally turn-assist ring 22 may be composed of polyacetal showing good self-lubricity to exhibit good slidability relative to the fixed ring 21 which is actually turnable together with the post member 17.

As described above, the support structure 3 is formed by securing the stand support 5 horizontally or laterally turnable within prescribed angle range relative to the support base 6 and attaching the display attachment-member 4 so as to be tiltable up- and down-wardly to the stand support 5, whereby the display unit 2 is mounted securely onto the display attachment member 4. On the other hand, display unit 2 is supplied with electricity for displaying information or data inputted, e.g., from a key board of a main electronic apparatus. For this purpose, a cable 31 including a power cable and an interface cable has to be connected to the display unit 2.

Figure 25:
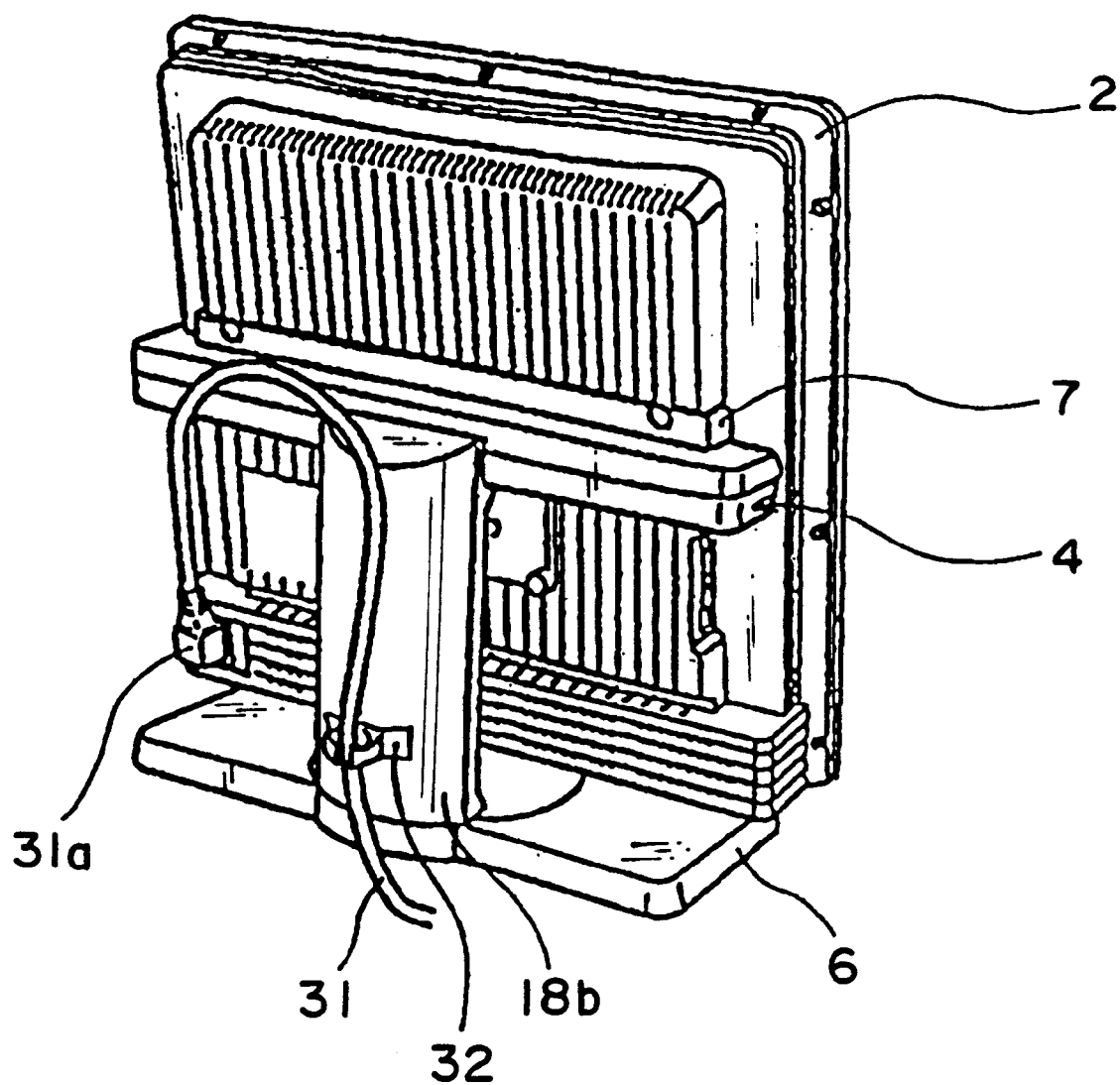
FIG. 25 is a rear perspective view of a display apparatus.

Accordingly, in the display apparatus 1 equipped with the support structure 3 according to this embodiment shown in FIG. 25, a character C-shaped clamp 32 as a cable clamping member is projectively attached to a lower part of the rear post cover 18b of the stand support 5 so as to prevent difficulties accompanying the provision of the cable 31, including the disorder of surrounding materials, such as cup and vases, on a place (such as a desk), and the insertion of the cable below the support stand 6.

As a result, as shown in FIG. 25, the plug 31a of the cable 31 may be connected to a socket disposed on the back of the display unit 2 while forming a loop with an intermediate portion of the cable 31 to clamp a part of the cable 31, whereby the connection from the other appliances to the display unit 2 is ensured without causing disorder by the cable. For example, as the display unit 2 is laterally turned integrally with the stand support 5, the cable neatly affixed to the stand support 5 is not moved vigorously to cause disorder or impair the stability of the support structure 3.

<Support Base 6>

Figure 33:
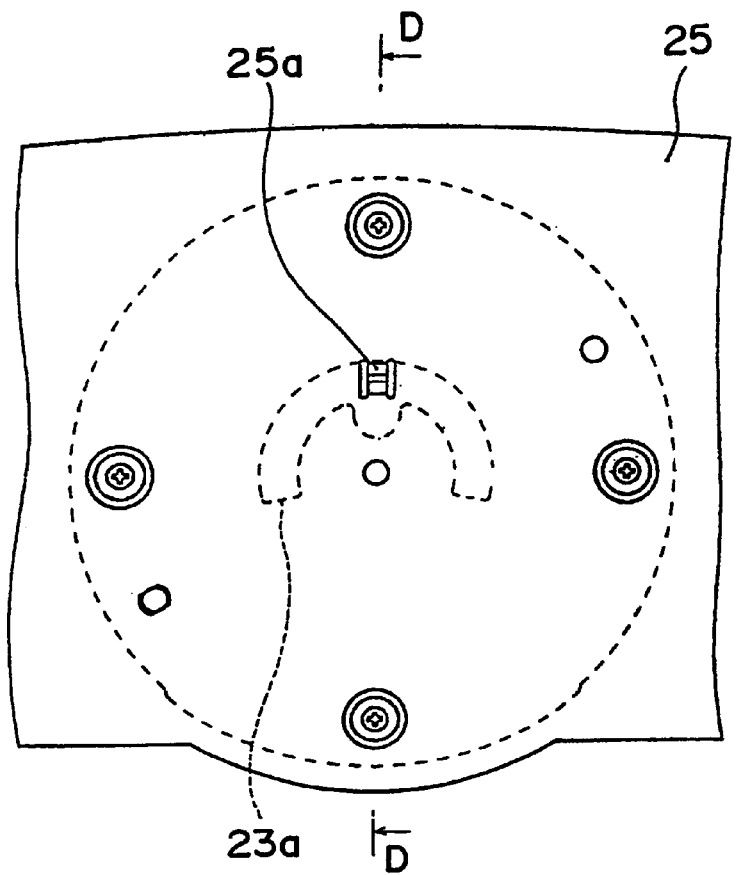
FIG. 33 is a bottom plan view of a support stand base.
Figure 34:
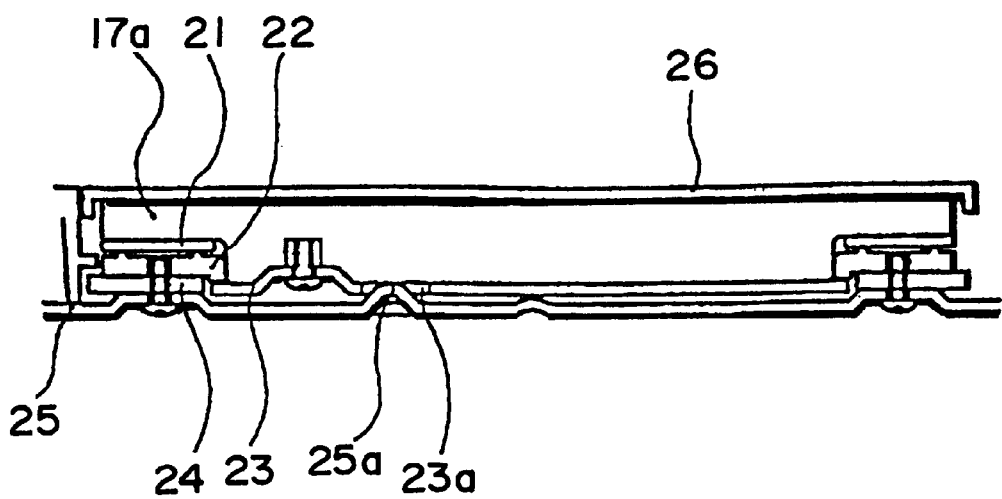
FIG. 34 is a sectional view taken along line D—D in FIG. 33.

The support base 6 is formed by covering the stand base 25 to which the horizontal turn-assist ring 22 and the assist ring support 24 are fixed as shown in FIG. 33 with a base cover 26. The stand base 25 is provided with a projection 25a to be engaged with the aperture 23a of the post member stopper plate 23 shown in FIG. 29 (FIG. 34). As a result of an association between the projection 25a and the aperture 23a, the laterally turnable range of the stand support 5 is regulated.

The base cover 26 is provided with turnable base-accommodable aperture 26s (FIG. 2) through which the turnable base 17a is inserted, and a turning member cover 27 is fitted into the aperture 26a to close the aperture 26a.

The stand base 25 is further provided with a slippage prevention seat 28 of, e.g., rubber or sponge, attached at its four corners so as to prevent the movement of the stand base 25 accompanying the lateral turning of the stand support 5.

To the support structure 3 of this embodiment, a relatively heavy display unit 2 may be attached, it is necessary to take care of ensuring the stability of the display apparatus 1 set on a surface inclined within an allowable extent even when the display unit 2 thereof is tilted vertically.

For this purpose, a plurality of the slippage prevention seats (contacts) 28 are disposed to ensure the stability of the display apparatus 1. More specifically, the seats 28 placed on an inclined setting surface are projected onto a horizontal reference plane and the projected seats are connected successively to form an imaginary horizontal region defining an effective support region. Then, the display apparatus 1 is placed on a setting surface having a maximum tolerable slope angle θ, and a vertical line is drawn from the gravity center of the display apparatus 1 to the horizontal reference plane. The slippage prevention seats 28 are disposed so that the vertical line drawn in the above-described manner always falls within the effective support region at any tilted position of the display unit 2.

Figure 22:
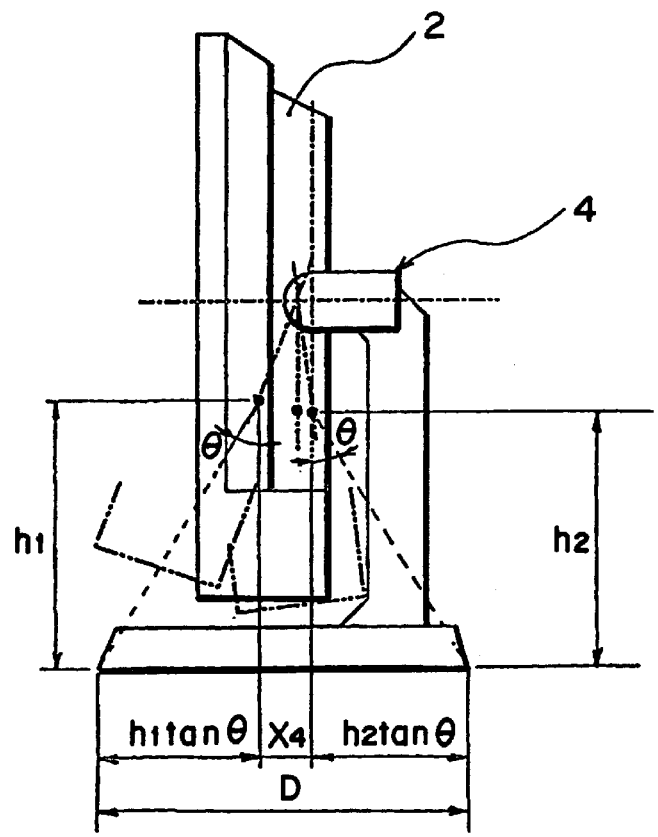
FIG. 22 is an illustration for defining a depth D of a support stand.

The relationship may be defined by the following equation (7) with reference to FIG. 22. Thus, in case where the gravity center of the display apparatus 1 is moved in front and rear directions, $h_1$ is taken as a height of the gravity center from the setting surface when the gravity center is at the frontmost position, $h_2$ is taken as the high of the gravity center at the rearmost position, $X_4$ is taken as a horizontal distance between the frontmost position and the rearmost position and H is taken as an intersection of a vertical line from the gravity center and the effective support region. At this time, the width of the effective support region, i.e., the distance between the seats D, encompassing the movable range of H in the front and rear direction is given by the following equation (7).

$$D = X_4 + (h_1 + h_2)\tan\theta \quad (7).$$

Incidentally, the above equation (7) has been derived based on a premise that the maximum tolerable slope angle is identical for both the forward and rearward slopes. In case where the tolerable angle is different between the front and rear directions, the following equation (7') is given:

$$D = X_4 + h_1 \cdot \tan\theta_1 + h_2 \cdot \tan\theta_2 \quad (7'),$$

wherein $\theta_1$ and $\theta_2$ denote maximum tolerable slope angles in the front and rear directions, respectively.

If the seats 28 are disposed to provide a distance exceeding D given by the equation (7) or (7'), the stability of the display apparatus 1 can be ensured. The angles θ, $\theta_2$ and $\theta_2$ may preferably have a value of ca. 10 deg. and may be set to ca. 15 deg. as design values including a margin.

More specifically, the support structure 3 includes a stand support 5 turnable about a vertical axis standing upright relative to the support base 6, and the stand support 5 includes a disk-shaped unit having a peripheral portion turnable relative to the support 6. The disk-shaped unit has a diameter d which is set to be smaller than the width of the effective supporting region D.

Figure 23:
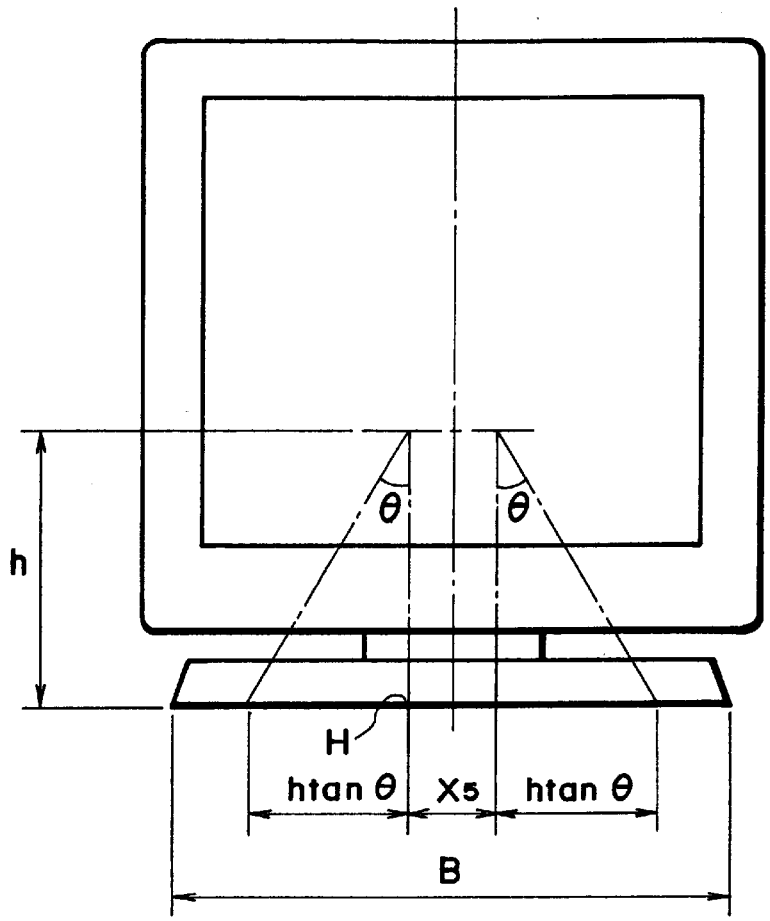
FIG. 23 is an illustration for giving a definition of width B of a support stand.
Figure 24:
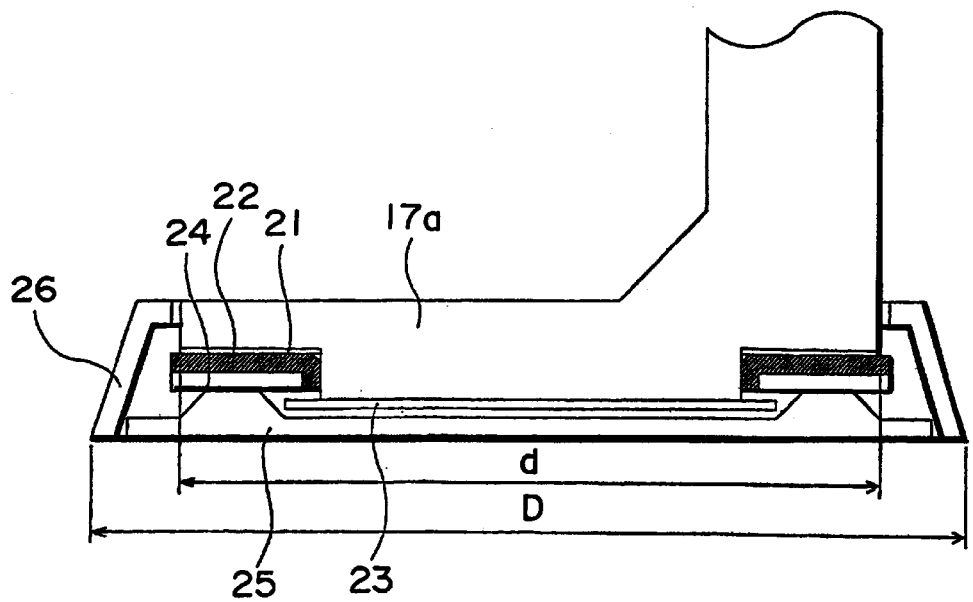
FIG. 24 a partial side view for illustrating a turning base diameter and a support stand depth.

The same consideration has to be made in leftward and rightward turnings as shown in FIG. 23 wherein h denotes a height of the gravity center from the setting surface on which the whole surface of the stand base 25 is assured to be placed, θ denotes a maximum tolerable slope angle of the setting surface, and $X_5$ denotes a deviation in horizontal direction of the gravity center between the leftward and rightward turnings. A required minimum width B in lateral direction of the effective support region (or lateral distance B between the seats 28) may be given by the following equation (8):

$$B = 2h \tan\theta + X_5 \quad (8).$$

The above equation (b) has been described based on a premise that the maximum tolerable slope angle is identical for both leftward and rightward slopes. In case where the tolerable slope angle, is different for the two directions, the following equation (8') is given:

$$B - h(\tan\theta_3 + \tan\theta_4) + X_5 \quad (8'),$$

wherein $\theta_3$ and $\theta_4$ denote maximum tolerable slope angles in left and right, directions, respectively.

Thus, by setting the lateral width of the effective support region to exceed the value B givenly equation (8) or (8'), the stability of the display apparatus 1 against the lateral turning is ensured. The angles θ, $θ_1$ and $θ_2$ may preferably have a value of ca. 10 deg. and may be set to ca. 15 deg. as design values including a margin.

Hereinbelow, the operation of the support structure according to the first embodiment of the present invention will be described.

The display unit 2 may be mounted on the display holder 7 by engaging the pins 2028 with the recesses 7b of the display holder 7 (FIG. 27), and then screwing the display unit 2 and the display holder 7 to each other (FIG. 28).

The tilting (turning) in vertical directions of the display unit will now be supplemented.

When the display unit is at an arbitrary home position without application of any operation force F, the torque occurring about the axis member 12 due to the forward deviation X of the gravity center from the axis member 12 and the own weight W of the display unit 2 acts in a direction of tightly winding the locked spring 13 to decrease the inner diameter of the locked spring 13 and tighten the axis member 12, whereby the display unit is held in position due to the frictional force acting between the locked spring 31 and the axis member 12.

Figure 14:
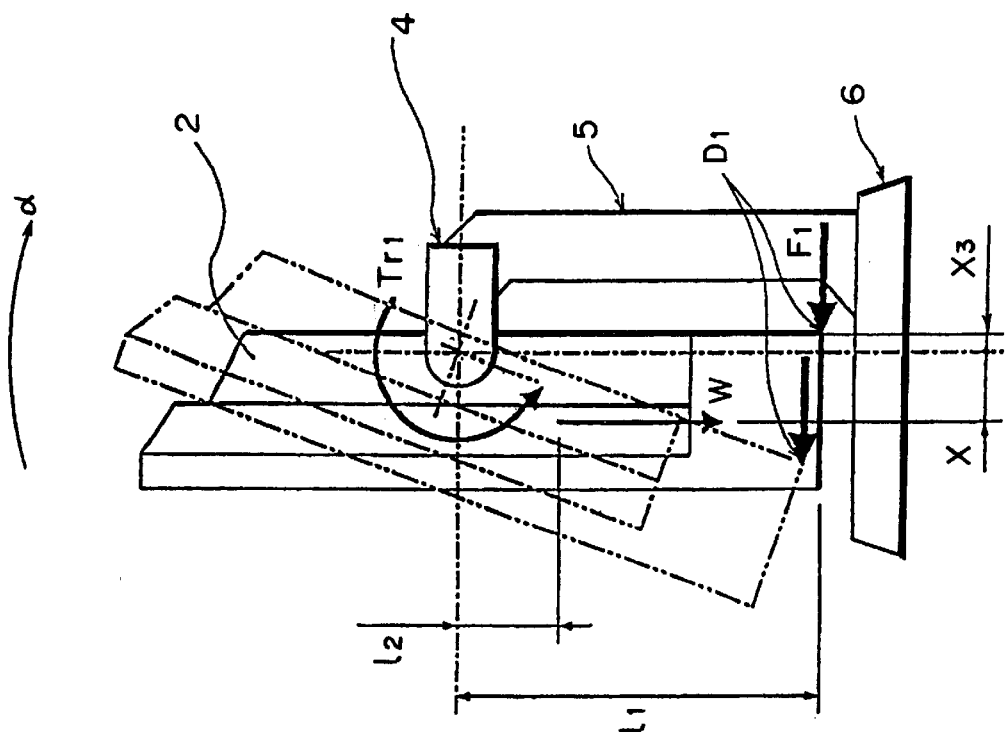
FIGS. 14–17 are respectively an operational illustration for illustrating an operation force, a torque occurring on an axial member and moment occurring based its own weight (corresponding to FIGS. 6–9, respectively).
Figure 15:
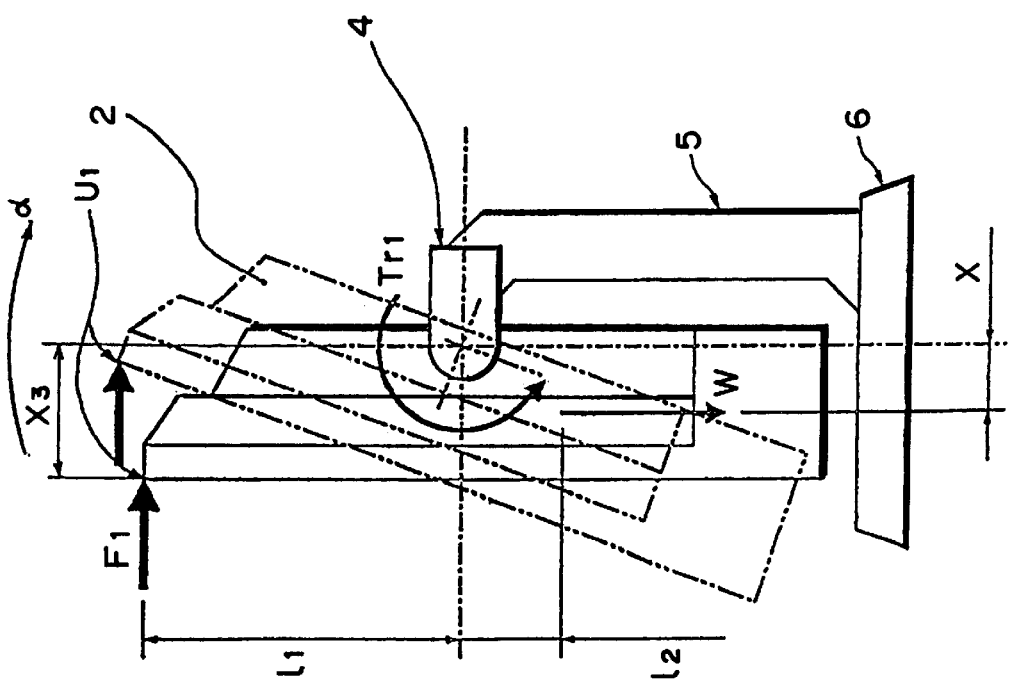

Then, in order to tilt the display unit 2 in a home position as shown in FIG. 14 upward, an application point $U_1$ at the upper end of the display unit 2 may be pushed at an operation force $F_1$ exceeding a prescribed value. As a result, the operation force $F_1$ acting on the point $U_1$ turns the axis member 12 via the display holder 7 in a direction of enlarging the inner diameter of the locked spring 13. As a result, the pressure contact force acting onto the axis member 12 is reduced to reduce the resisting downward torque $Tr_1$ occurring in resistance to upward tilting of the display unit 2, so that the upward turning operation force $F_1$ becomes larger than the downward torque $Tr_1$ and the torque WX based on the own weight of the display unit 2 to allow an upward tilting of the display unit 2. During the pushing of the display unit 2 at an operating force $F_1$ exceeding the prescribed value, the display unit 2 is turned upward. Thereafter, when the operation force $F_1$ is released, the internal diameter of the locked spring 13 is reduced to restore the original pressure contact force against the axis member 12, whereby the display unit 2 is stopped at a position where the operation force $F_1$ is released.

Further, in order to tilt the display unit 2 in a home position as shown in FIG. 5 upward, an application point $D_1$ at the lower end of the display unit 2 may also be pushed at an operation force $F_1$ exceeding a prescribed value. As a result, the operation force $F_1$ acting on the point $D_1$ turns the axis member 12 via the display holder 7 in a direction of enlarging the inner diameter of the locked spring 13. As a result, the pressure contact force acting onto the axis member 12 is reduced to reduce the resisting downward torque $Tr_1$ occurring in resistance to upward tilting of the display apparatus main body 2, so that the upward turning operation force $F_1$ becomes larger than the downward torque $Tr_1$ and the torque WX based on the own weight of the display unit 2 to allow an upward tilting of the display unit 2. During the pushing of the display unit 2 at an operating force $F_1$ exceeding the prescribed value, the display unit 2 is turned upward. Thereafter, when the operation force $F_1$ is released, the internal diameter of the locked spring 13 is reduced to restore the original pressure contact force against the axis member 12, whereby the display unit 2 is stopped at a position where the operation force $F_1$ is released.

As described above, the display unit 2 can be tilted upward to an arbitrary position by applying an operation force $F_1$ exceeding a prescribed resisting force including a downward resisting torque $Tr_1$. Further, by abutment of the back surface of the display unit 2 against the coupling member 8a of the support arm 8, a further upward turning of the display unit 2 is regulated.

Figure 16:
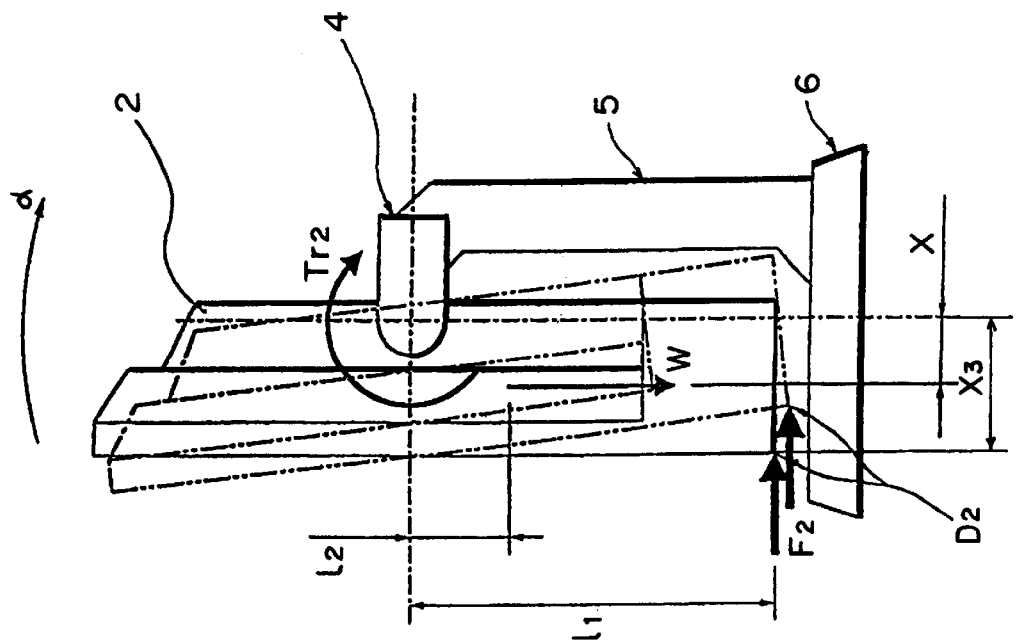

Then, in order to tilt the display unit 2 in a home position as shown in FIG. 16 downward, an application point $U_2$ at the upper end of the display unit 2 may be pushed at an operation force $F_2$ exceeding a prescribed value. As a result, the operation force $F_2$ acting on the point $U_2$ turns the axis member 12 via the display holder 7 in a direction of decreasing the inner diameter of the locked spring 13. As a result, the pressure contact force and frictional force acting onto the axis member 12 are increased to increase the resisting upward torque $Tr_2$. However, as the torque WX based on the own weight of the display unit 2 is added to the downward turning operation force $F_2$ to exceed the upward torque $Tr_2$, thereby allowing a downward tilting of the display unit 2. During the pushing of the display unit 2 at an operating force $F_2$ exceeding the prescribed value, the display unit 2 is turned downward. Thereafter, when the operation force $F_2$ is released, the internal diameter of the locked spring 13 is restored to the original value, and the display unit 2 is stopped at a position where the operation force $F_2$ is released.

Figure 17:
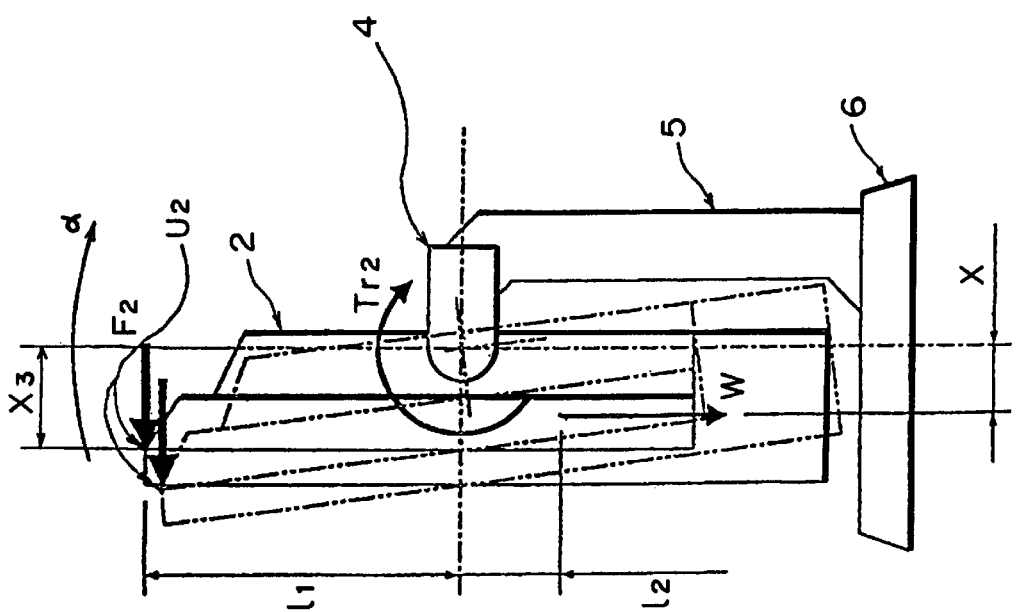

Further, in order to tilt the display unit 2 in a home position as shown in FIG. 17 downward, an application point $D_2$ at the lower end of the display unit 2 may also be pushed at an operation force $F_2$ exceeding a prescribed value. As a result, the operation force $F_2$ acting on the point $D_2$ turns the axis member 12 via the display holder 7 in a direction of decreasing the inner diameter of the locked spring 13. As a result, the pressure contact force and frictional force acting onto the axis member 12 are increased to increase the resisting upward torque $Tr_2$. However, as the torque WX based on the own weight of the display unit 2 is added to the downward turning operation force $F_2$ to exceed the upward torque $Tr_2$, thereby allowing a downward tilting of the display unit 2. During the pushing of the display unit 2 at an operating force $F_2$ exceeding the prescribed value, the display unit 2 is turned downward. Thereafter, when the operation force $F_2$ is released, the internal diameter of the locked spring 13 is restored to the original value, and the display unit 2 is stopped at a position where the operation force $F_2$ is released.

As described above, the display unit 2 can be tilted downward to an arbitrary position by applying an operation force $F_2$ exceeding a prescribed resisting force including an upward resisting torque $Tr_2$. Further, by abutment of the back surface of the display unit 2 against the stopper 20 of the stand support 5, a further downward turning of the display unit 2 is regulated.

As an overall effect of the above-described operation mechanism, the display unit 2 can be tilted upward and downward at almost equal operation forces. The tilting may be performed smoothly, and the display unit 2 can be placed in an arbitrary tilted position within a prescribed angle.

Figure 35:
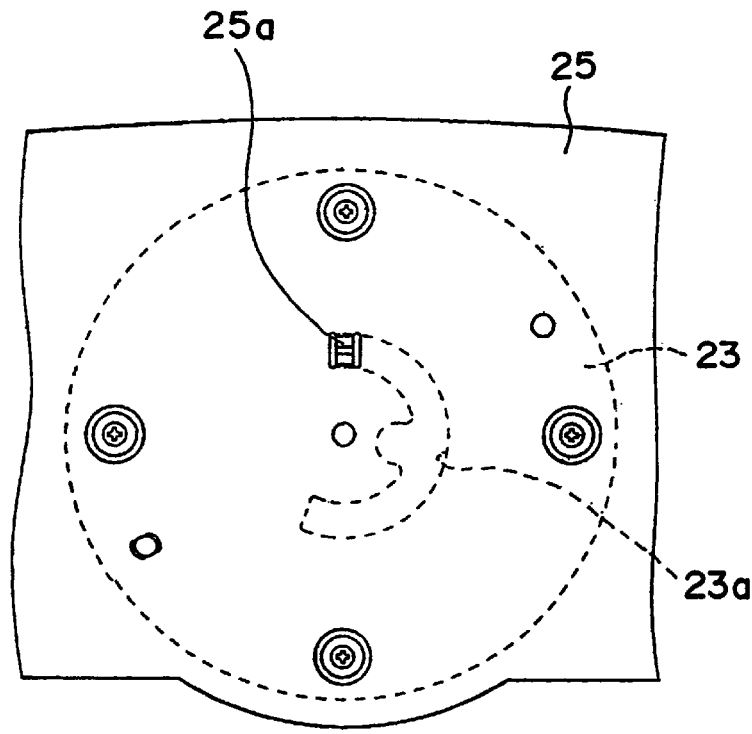
FIGS. 35 and 36 show states where a post member-stopper plate is turned clockwise and counter-clockwise, respectively, with respect to a support stand base.
Figure 36:
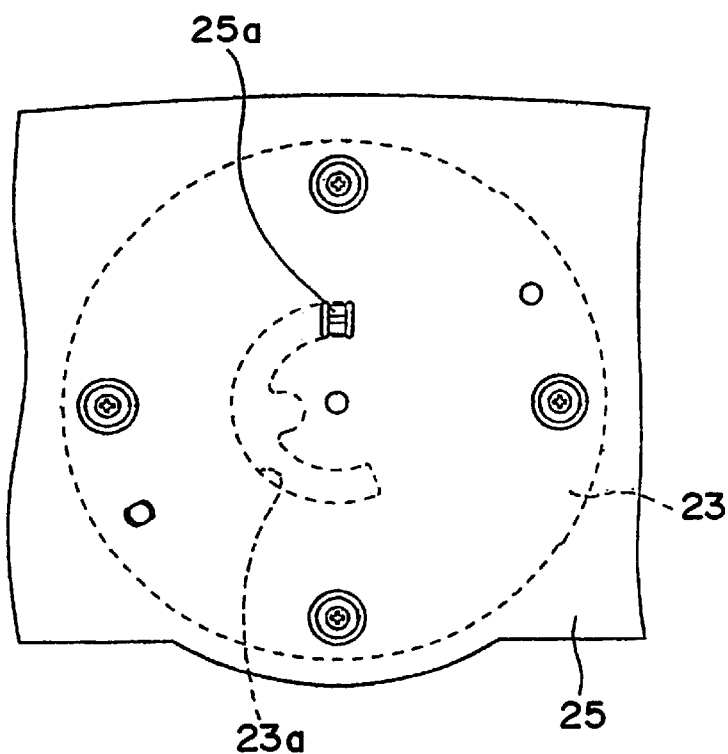

On the other hand, in order to turn the display unit 2 in lateral directions (i.e., leftwards and rightwards), an operation force may be applied to an application point on a side of the display unit 2 to turn the body 2 relative to the support structure 3. As described above, the horizontal turn-assist ring 22 is inserted between the post member stopper plate 23 and the fixed ring 21 affixed to the post member 17, and the horizontal turn-assist ring 22 and the assist ring support plate 24 are fixed to the stand base 25. Further, the projection 25a of the stand base 25 is inserted into the aperture 23a in the post member stopper plate 23. As a result, the display panel of the display unit 2 may be turned leftwards, for example, by turning the crescent-shaped post member stopper plate 23 so a to slide its aperture 23a along the projection 25 (which is initially positioned at the center of the crescent aperture 23a) as shown in FIG. 35 whereby the display unit 2 can be turned clockwise by nearly 90 deg. Similarly, the display unit 2 may be turned rightwards by turning the stopper plate 23 so as to slide its aperture along the projection 25a of the stand base 25, whereby the display unit 2 can be turned counterclockwise by nearly 90 deg.

Further, by defining the minimum depth D and the minimum width B of the support base 6 by the equations (7) and (8), the gravity center of the display apparatus can be retained within the effective support region of the support base even if the display unit is turned by 90 deg. either leftwards or rightwards provided that the support 6 is placed on a setting surface within a tolerable slope angle range. As a result, a stable turning in lateral directions of the display unit is ensured.

Next, a second embodiment of the present invention will be described with reference to the drawings.

As shown in FIGS. 37–44, the second embodiment is directed to a display apparatus having a tilt axis (axis member) deviated forward from its gravity center. The display apparatus includes a stand support 30 of which an upper end provides a bearing and, between the bearing and the lateral sides (left side and right side) of the display unit 2, tilting mechanisms 10 (10r and 10l) identical to those used in the above first embodiment are installed. The tilting mechanisms 10 are installed on the lateral sides of the housing of the display unit 2, and the left and right locked springs are wound about left and axis members in an identical winding direction. The display unit 2 includes relatively heavy components, such as a drive circuit and a control circuit in its rear side projecting rearward from the axis member, so that the gravity center of the display unit 2 is deviated rather than backward than the axis member.

In the state where no operation force for changing the tilt angle is applied to the display unit 2 and the display unit 2 is in its home position, each tilting mechanism is so designed that the own weight of the display unit 2 causes a torque WX about the axis member due to a rearward bias of the gravity center acting in a direction of tightly winding the locked spring to reduce the inner diameter of the locked spring, thereby tightly holding the axis member. Accordingly, the display unit 2 is stopped in its home position due to a frictional force of the locked spring acting on the axis member.

Figure 37:
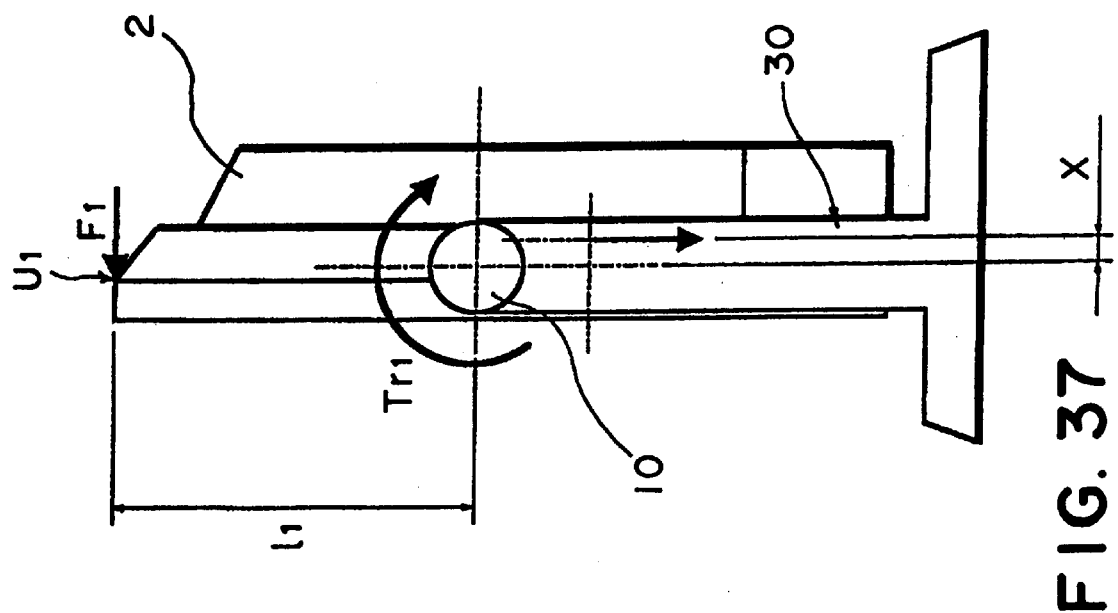

Referring to FIG. 37, when an upper application point $U_1$ of the display unit 2 placed in its home position is pushed at an operation force $F_1$ exceeding a prescribed value to tilt the display unit 2 downwards, the tilting mechanisms 10 are so designed that the axis member is turned relative to the locked spring, thereby enlarging the inner diameter of the locked spring to reduce the pressure contact force acting onto the axis member. As a result, when the display unit 2 is tilted downward, the upward resisting torque $Tr_1$ is reduced, so that the torque caused by the downward tilting operation force $F_1$ becomes larger than the upward generated torque $Tr_1$ and the torque WX caused by the own weight of the display unit 2, whereby the display unit 2 is tilted downward.

Figure 38:
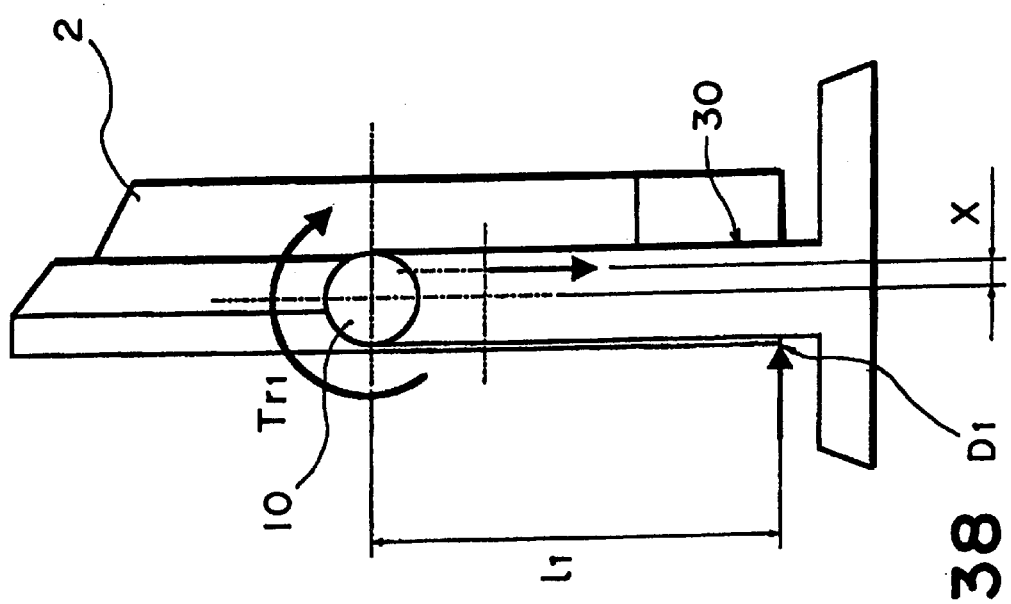
FIGS. 37 and 38 are schematic side views for illustrating downward tilting by application of operation forces at an upper end and a lower end, respectively, of a display unit in a display apparatus including a support structure according to a second embodiment.

Similarly, referring to FIG. 38, when a lower application point $D_1$ of the display unit 2 placed in its home position is pushed at an operation force $F_1$ exceeding a prescribed value to tilt the display unit 2 downwards, the tilting mechanisms 10 are so designed that the axis member is turned relative to the locked spring, thereby enlarging the inner diameter of the locked spring to reduce the pressure contact force acting onto the axis member. As a result, when the display unit 2 is tilted downward, the upward resisting torque $Tr_1$ is reduced, so that the torque caused by the downward tilting operation force $F_1$ becomes larger than the upward generated torque $Tr_1$ and the torque WX caused by the own weight of the display unit 2, whereby the display unit 2 is tilted downward.

Figure 39:
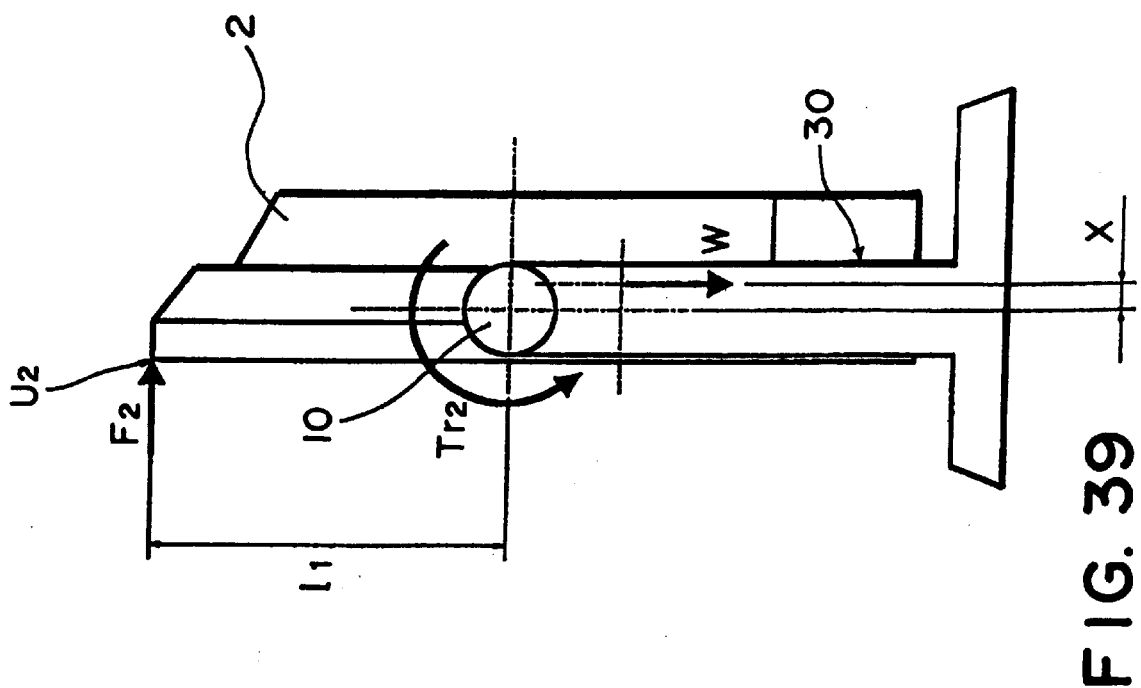

Further, referring to FIG. 39, when an upper application point $U_2$ of the display unit 2 placed in its home position is pushed at an operation force $F_2$ exceeding a prescribed value to tilt the display unit 2 upwards, the tilting mechanisms 10 are so designed that the axis member is turned relative to the locked spring in a direction opposite to the winding direction of the locked spring, thereby reducing the inner diameter of the locked spring to increase the pressure contact force acting onto the axis member. However, as the moment WX based on the own weight of the display unit 2 is added to the operation force $F_2$ to exceed the generated downward resisting torque $Tr_2$, the display unit 2 can be tilted upward by the operation force $F_2$.

Figure 40:
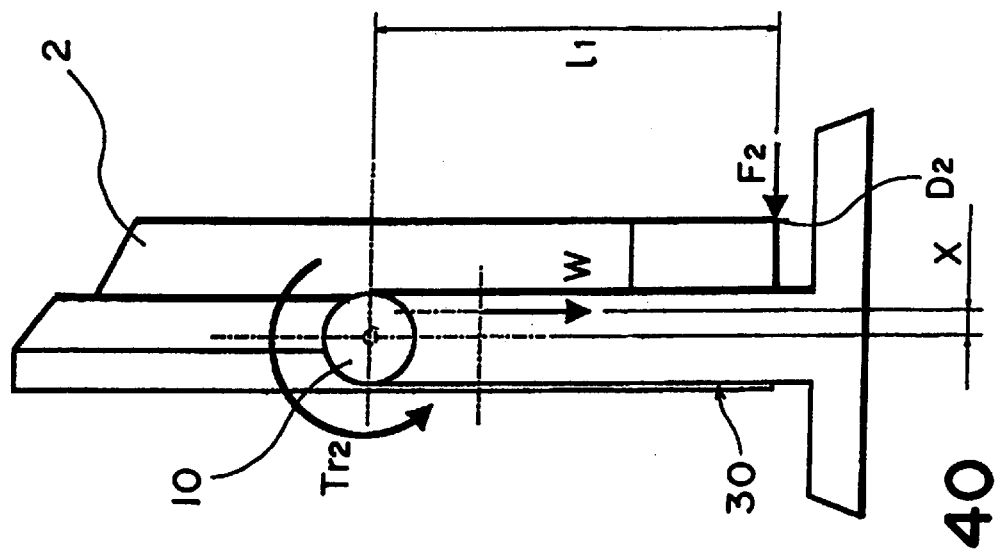
FIGS. 39 and 40 are schematic side views for illustrating upward tilting by application of operation forces aper end and a lower end, respectively, of thisplay unit.

Similarly, referring to FIG. 40, when a lower application point $D_2$ of the display unit 2 placed in its home position is pushed at an operation force $F_2$ exceeding a prescribed value to tilt the display unit 2 upwards, the tilting mechanisms 10 are so designed that the axis member is turned relative to the locked spring in a direction opposite to the winding direction of the locked spring, thereby reducing the inner diameter of the locked spring to increase the pressure contact force acting onto the axis member. However, as the moment WX based on the own weight of the display unit 2 is added to the operation force $F_2$ to exceed the generated downward resisting torque $Tr_2$, the display unit 2 can be tilted upward by the operation force $F_2$.

Next, the tilting operation for tilting the display unit 2 from a prescribed position to an arbitrary vertical position will now be described.

When the display unit 2 is at an arbitrary home position receiving no operation force for tilting, the torque occurring about the axis member due to the rearward deviation of the gravity center from the axis member and the own weight of the display unit 2 acts in a direction of tightly winding the locked spring to decrease the inner diameter of the spring and tighten the axis member, whereby the display unit 2 is held in position due to the frictional force acting between the locked spring and the axis member.

Figure 41:
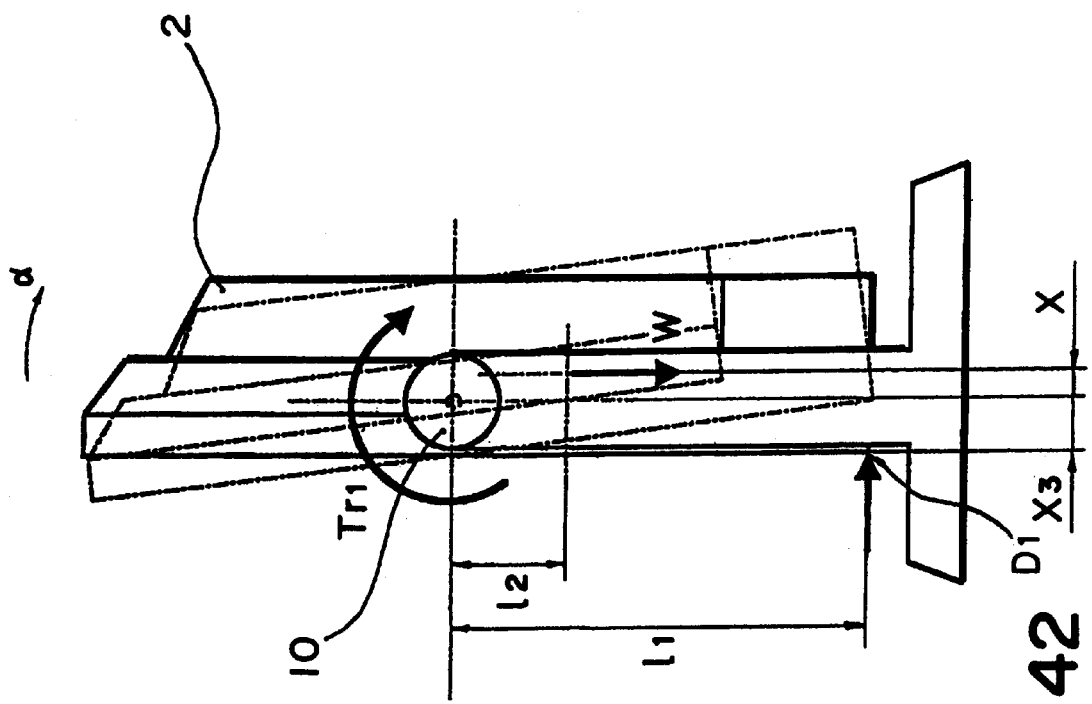
FIGS. 41–44 are respectively an operational illustration for illustrating an operation force, a torque occurring on an axial member and a moment occurring based on an the weight of the display unit (corresponding to FIGS. 37–40, respectively).

Then, in order to tilt the display unit 2, e.g., in its home position as shown in FIG. 41 downward, an application point $U_1$ at the upper end of the display unit 2 may be pushed at an operation force $F_1$ exceeding a prescribed value. As a result, the operation force $F_1$ acting on the point $U_1$ turns the axis member in a direction of enlarging the inner diameter of the locked spring. As a result, the pressure contact force acting on the axis member is reduced to reduce the resisting upward torque $Tr_1$ occurring in resistance to downward tilting of the display unit 2, so that the downward tilting operation force $F_1$ exceeds the resisting upward torque $Tr_1$ and the torque based on the own weight W of the display unit 2 to allow a downward tilting of the display unit 2. During the application of the operation force $F_1$ exceeding the prescribed value, the display unit is turned downward. Thereafter, when the operation force $F_1$ is released, the internal diameter of the locked spring is reduced to restore the original pressure contact force acting on the axis member, whereby the display unit 2 is stopped at a position when the operation force $F_1$ is released.

Figure 42:
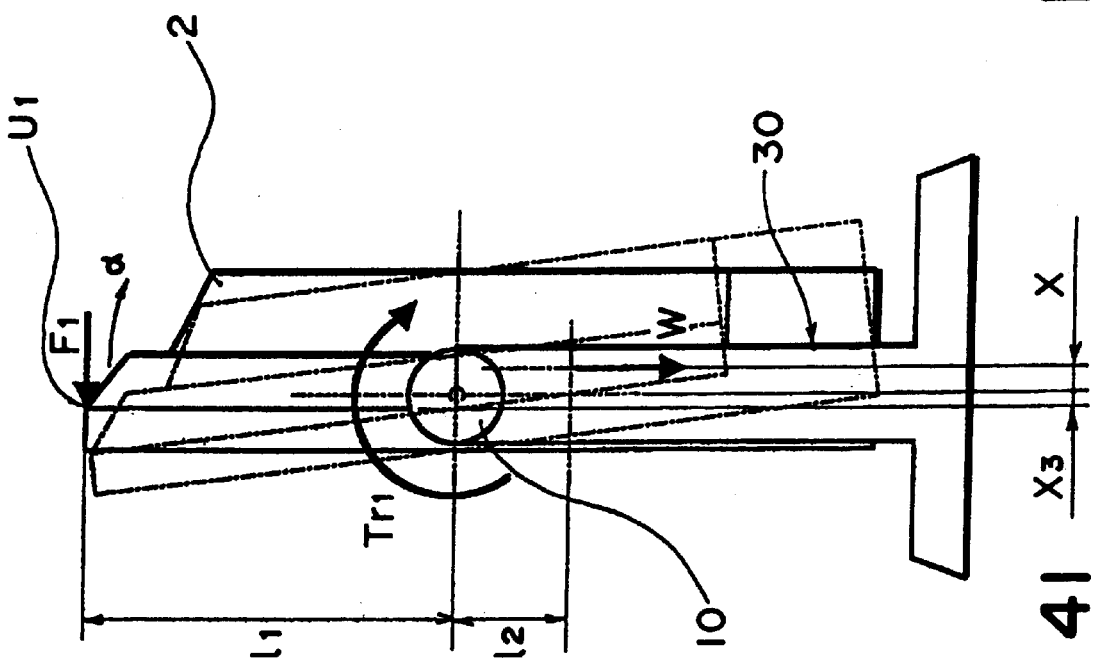

Then, in order to tilt the display unit 2, e.g., in its home position as shown in FIG. 42 downward, an application point $D_1$ at the lower end of the display unit 2 may be pushed at an operation force $F_1$ exceeding a prescribed value. As a result, the operation force $F_1$ acting on the point $D_1$ turns the axis member in a direction of enlarging the inner diameter of the locked spring. As a result, the pressure contact force acting on the axis member is reduced to reduce the resisting upward torque $Tr_1$ occurring in resistance to downward tilting of the display unit 2, so that the downward tilting operation force $F_1$ exceeds the resisting upward torque $Tr_1$ and the torque based on the own weight W of the display unit 2 to allow a downward tilting of the display unit 2. During the application of the operation force $F_1$ exceeding the prescribed value, the display unit is turned downward. Thereafter, when the operation force $F_1$ is released, the internal diameter of the locked spring is reduced to restore the original pressure contact force acting on the axis member, whereby the display unit 2 is stopped at a position when the operation force $F_1$ is released.

Figure 43:
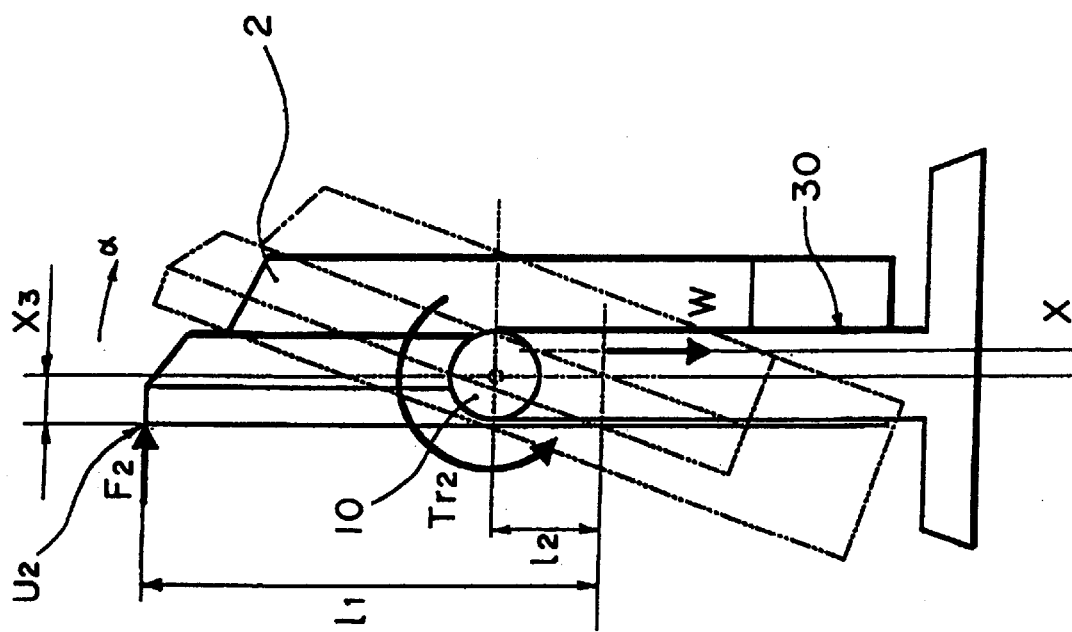

Then, in order to tilt the display unit 2, e.g., in its home position as shown in FIG. 43 upward, an application point $U_2$ at the upper end of the display unit 2 may be pushed at an operation force $F_2$ exceeding a prescribed value. As a result, the operation force $F_2$ acting on the point $U_2$ turns the axis member in a direction of reducing the inner diameter of the locked spring. As a result, the pressure contact force acting on the axis member is increased to increase the resisting downward torque $Tr_2$. However, the torque based on the own weight W of the display unit 2 is added to the operation force $F_2$ to exceed the resisting downward torque $Tr_2$ thereby allowing an upward tilting of the display unit 2 by the operation force $F_2$. During the application of the operation force $F_2$ exceeding the prescribed value, the display unit is turned downward. Thereafter, when the operation force $F_2$ is released, the internal diameter of the locked spring is reduced to restore the original pressure contact force acting on the axis member, whereby the display unit 2 is stopped at a position when the operation force $F_2$ is released.

Figure 44:
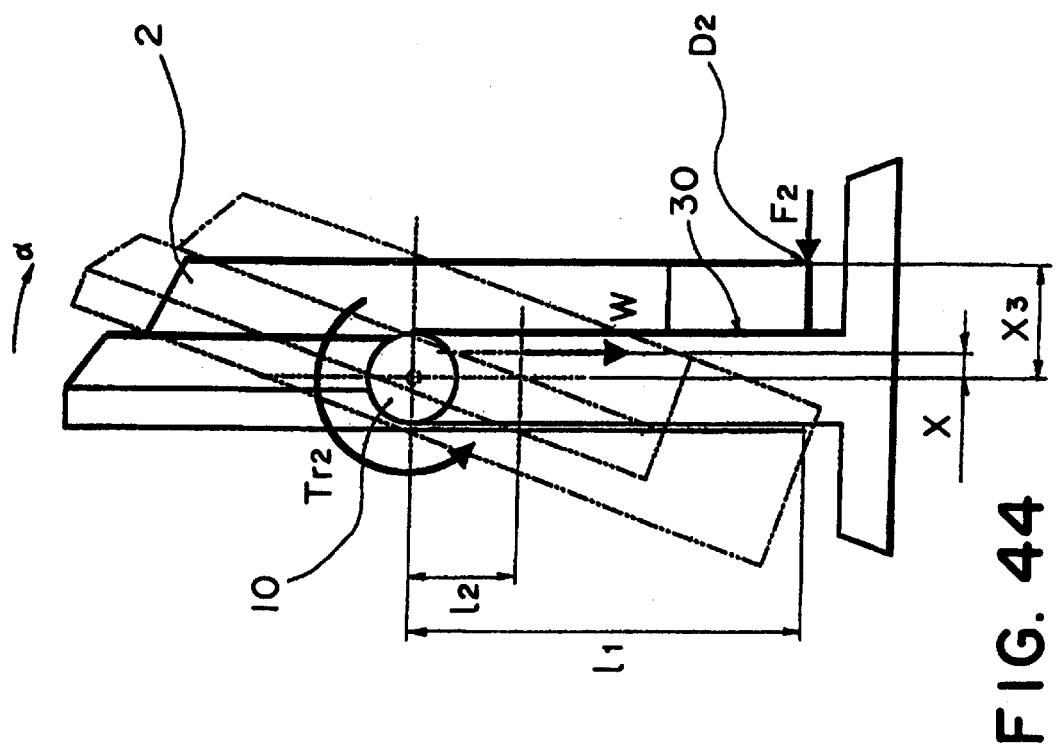

Then, in order to tilt the display unit 2, e.g., in its home position as shown in FIG. 44 upward, an application point $D_2$ at the upper end of the display lower 2 may be pushed at an operation force $F_2$ exceeding a prescribed value. As a result, the operation force $F_2$ acting on the point $D_2$ turns the axis member in a direction of reducing the inner diameter of the locked spring. As a result, the pressure contact force acting on the axis member is increased to increase the resisting downward torque $Tr_2$. However, the torque based on the own weight W of the display unit 2 is added to the operation force $F_2$ to exceed the resisting downward torque $Tr_2$ thereby allowing an upward tilting of the display unit 2 by the operation force $F_2$. During the application of the operation force $F_2$ exceeding the prescribed value, the display unit is turned downward. Thereafter, when the operation force $F_2$ is released, the internal diameter of the locked spring is reduced to restore the original pressure contact force acting on the axis member, whereby the display unit 2 is stopped at a position when the operation force $F_2$ is released.

In the above, the support structure has been described with reference to a stand type wherein the support structure body (display attachment) member is supported by a stand support 5 and a support base 6. However, the support structure according to the present invention can composed as a type wherein the support structure is hanged on a wall or hanged down from a higher point.

The support structure according to the present invention is suitable for supporting a display unit as a body to be supported as in the above embodiments but can be also applicable to other types of bodies to be supported.

As described in detail above, according to the support structure of the present invention, the stand support held upright by a stand base and an attachment member for attaching a body to be supported thereto and coupled to each other in an electrically insulated state, so that the stand support is free from resonance with radiation interference wave, thus free from amplifying the radiation interference wave and providing an electromagnetic environmental compatibility.

Further, as the support structure is composed by a stand support held upright by a support base and an attachment member for attaching a body to be supported laterally mounted on the stand support, it is possible to provide a sufficient mechanical strength by a simple structure.

The support structure may be constituted to generate a downward resisting torque generated in resistance to an operation force for upwardly tilting a body to be supported in a direction opposite to a torque caused by an own weight of the body, and an upward resisting torque generated in resistance to an operation force for downwardly tilting the body to be supported, such that the downward resisting torque is smaller than the upward resisting torque. As a result, the difference in operation force between upward tilting and downward tilting is decreased to alleviate an uneasy touch during the tilting operation.

The torque difference $\Delta T$ may set depending on WX to further reduce the difference in operation between the upward and downward tilting.

By setting the torque difference $\Delta T$ to compensate for 2WX, i.e., to be substantially identical to 2WX, it is possible to substantially equalize the upward and downward tilting operation forces, thereby providing a further improved operation touch in vertical tilting.

The support structure stands upright even when it does not support a body to be supported, so that it is easy to mount or install the body thereon.

The laterally pairing tilting mechanisms are so constituted that the locked springs threat are wound in an identical direction, whereby each tilting mechanism is required to generate a smaller torque and can be reduced in size, thereby reducing the entire support structure in size.

As the operation force is set within a range of $10 \leq F \leq 40$ (N), it is possible to obviate a difficulty that the supported body is tilted unintentionally at a small force, or too large an operation force is required for tilting the supported body.

As the attachment member can be disposed within a projection area of the body to be supported, so that the attachment member is free from providing an uneasy appearance even when the body to be supported is a display unit.

Based on factors, such as a horizontal distance between the back surface of a body to be supported and upward and downward tiltable angles, it is possible to set the size and strength of an upper arm cover and a lower arm cover as large as possible.

What is claimed is:

1. A support structure capable of supporting a body generally vertically but tiltably from a prescribed position about a laterally extending tilt axis, where the body to be supported is a flat display panel having a back surface, a gravity center and a weight, said support structure comprising:

a tilting mechanism, having a tilt axis, to be disposed on the back surface of the flat display panel at a position shifted by a deviation X in a horizontal direction from the gravity center of the body to be supported and capable of stably holding the body to be supported at an arbitrary tilt angle within a prescribed tiltable angle range about the tilt axis, and a support structure body capable of supporting the body to be supported via said tilting mechanism, wherein said tilting mechanism includes a resistance force-adjusting mechanism disposed at opposite lateral ends thereof, with each said resistance force-adjusting mechanism generating a downward torque $Tr_1$ and an upward torque $Tr_2$ larger than $Tr_1$, wherein the downward torque $Tr_1$ is a torque exerted by said tilting mechanism in resistance to an operation force capable of upwardly tilting the body to be supported, and the upward torque $Tr_2$ is a torque exerted by said tilting mechanism in resistance to an operation force capable of downwardly tilting the body to be supported, the downward direction agreeing to a direction of a torque WX caused by the weight W of the body to be supported and the deviation X, and the upward direction being opposite thereto, all the torques being taken about the tilt axis, wherein said resistance force adjusting mechanisms are set to generate the upward torque $Tr_2$ and downward torque $Tr_1$ giving a torque difference $\Delta T$, with $\Delta T=Tr_2-Tr_1$, depending on the torque WX caused by the weight of the body to be supported, said tilting mechanism includes a tilting member tiltably supported by said support structure body via said resistance force-adjusting mechanisms, and each said resistance force-adjusting mechanism includes an axis member and a locked spring which are integrally disposed with one and the other, respectively, of said support structure body and said tilting member, with said axis member being turnable in opposite directions relative to said locked spring to generate different torques during turning in the opposite directions, with said axis member disposed coaxially with said tilt axis and affixed to one of said support structure body and said tilting member, each said locked spring has a first end locked with the other of said support structure body and said tilting member and a second free end, and each said resistance force-adjusting mechanism is so composed that said locked spring has an inner diameter which is decreased to generate a larger frictional force with an outer surface of the axis member corresponding to said upward torque $Tr_2$ when the axis member is turned relative to said locked spring in a direction of winding from the first end to the second end of the locked spring, and is enlarged to generate a smaller frictional force with the outer surface of the axis member corresponding to said downward torque $Tr_1$ when the axis member is turned in a direction opposite to said direction of winding of the locked spring, wherein said tilting member is formed in a laterally elongated shape, and said locked spring at both ends are wound in an identical winding direction with respect to the tilt axis.

2. A supporting structure according to claim 1, wherein said support structure body comprises a support base, a stand support held upright by said support base, and an attachment member laterally held by said stand support for mounting thereon the body to be supported via said tilting mechanism, and said stand support and said attachment member are coupled to each other and electrically insulated from each other.

3. A support structure according to claim 2, wherein said support base, said stand support and said attachment member are disposed to form a shape of laterally disposed "H" in combination.

4. a support structure according to claim 2, wherein said stand support comprises an insulating material.

5. A support structure according to claim 2, wherein said stand support and said attachment member are connected to each other via an insulating member.

6. A support structure according to claim 1, wherein said resistance force adjusting mechanisms are set to generate the torque difference $\Delta T$ to be substantially equal to two times the torque WX.

7. A support structure according to claim 1, wherein said tilting member has an engaging member with which an engageable member provided on a back of the body to be supported is detachably engageable.

8. A support structure according to claim 1, having a gravity center providing a self-standing characteristic.

9. A support structure according to claim 1, wherein each said resistance force-adjusting mechanism further includes a spring holder through which the axis member is inserted so as to suppress an elongation at the second free end of the locked spring.

10. A display apparatus comprising:

a flat display panel having a back surface, a gravity center and a weight;

a tilting mechanism having a tilt axis disposed on said back surface of said flat display panel at a position shifted by a deviation X in a horizontal direction from the gravity center and stably holding said flat display panel generally vertically but tiltably at an arbitrary tilt angle within a prescribed tiltable angle range about the tilt axis; and a support structure body supporting said flat display panel via said tilting mechanism, with said support structure body including a support base, a stand support held upright by said support base, and an attachment member laterally held by said stand support and mounting said flat display panel via said tilting mechanism, and said stand support and said attachment member are coupled to each other and electrically insulated from each other, wherein said tilting mechanism includes a resistance force-adjusting mechanism disposed at opposite lateral ends thereof, with each said resistance force-adjusting mechanism generating a downward torque $Tr_1$ and an upward torque $Tr_2$ larger than $Tr_1$, wherein the downward torque $Tr_1$ is a torque exerted by said tilting mechanism in resistance to an operation force for upwardly tilting said flat display panel, and the upward torque $Tr_2$ is a torque exerted by said tilting mechanism in resistance to an operation force for downwardly tilting said flat display panel, the downward direction agreeing to a direction of a torque WX caused by the weight W of said flat display panel and the deviation X, and the upward direction being opposite thereto, all the torques being taken about the tilt axis, wherein said resistance force adjusting mechanisms are set to generate the upward torque $Tr_2$ and downward torque $Tr_1$ giving a torque difference $\Delta T$, with $\Delta T=Tr_2-Tr_1$, depending on the torque WX caused by the weight of said flat display panel, said tilting mechanism includes a tilting member tiltably supported by said support structure body via said resistance force-adjusting mechanisms, and each said resistance force-adjusting mechanism includes an axis member and a locked spring which are integrally disposed with one and the other, respectively, of said support structure body and said tilting member, with said axis member being turnable in opposite directions relative to said locked spring to generate different torques during turning in the opposite directions, with said axis member disposed coaxially with said tilt axis and affixed to one of said support structure body and said tilting member, each said locked spring has a first end locked with the other of said support structure body and said tilting member and a second free end, and each said resistance force-adjusting mechanism is so composed that said locked spring has an inner diameter which is decreased to generate a larger frictional force with an outer surface of the axis member corresponding to said upward torque $Tr_2$ when the axis member is turned relative to said locked spring in a direction of winding from the first end to the second end of the locked spring, and is enlarged to generate a smaller frictional force with the outer surface of the axis member corresponding to said downward torque $Tr_1$ when the axis member is turned in a direction opposite to said direction of winding of the locked spring, wherein said tilting member is formed in a laterally elongated shape, and said locked spring at both ends are wound in an identical winding direction with respect to the tilt axis.

11. A display apparatus according to claim 10, wherein said support base has on its lower surface a plurality of contacts or a continuously extending contact for directly contacting a setting surface, said plurality of contacts when sequentially connected or said continuously extending contact being disposed to surround an effective support region such that a vertical line drawn to a horizontal reference plane from a gravity center of the display apparatus disposed on the setting surface inclined at a maximum allowable slope angle θ in a front direction and a rear direction, respectively, of the display apparatus passes through said effective support region.

12. A display apparatus according to claim 11, wherein a gravity center of the display apparatus, as a result of moving said flat display panel, is movable in a front-to-rear direction and in a vertical direction, and the effective support region is set to have a depth D satisfying:

$$D > X_4 + (h_1 + h_2)\tan \theta,$$

wherein $h_1$ denotes a height of the gravity center of the display apparatus from a bottom contact point of the display apparatus when the gravity center of the display apparatus is moved to its foremost position, $h_2$ denotes a height of the gravity center of the display apparatus from the bottom contact point of the display apparatus when the gravity center of the display apparatus is moved to its rearmost position, $X_4$ denotes a distance between the foremost and rearmost positions, and D denotes a depth in the front-to-rear direction of the effective support region taken along a line passing through an intersection of said vertical line with the effective support region.

13. A display apparatus according to claim 10, wherein said support structure includes a support base having on its lower surface a plurality of contacts or a continuously extending contact for directly contacting a setting surface, said plurality of contacts when sequentially connected or said continuously extending contact being disposed to surround an effective support region such that a vertical line drawn to a horizontal reference plane from a gravity center of said display apparatus disposed on the setting surface inclined at a maximum allowable slope angle θ in a left direction and a right direction, respectively, of the display apparatus passes through the effective support region.

14. A display apparatus according to claim 13, wherein a gravity center of the display apparatus, as a result of moving said flat display panel, is movable in left and right directions, and the effective support region is set to have a width B satisfying:

$$B > 2h \cdot \tan \theta + X_5,$$

wherein h denotes a height of the gravity center of the display apparatus from a bottom contact point of the display apparatus, $X_5$ denotes a distance between leftmost and rightmost allowable positions of the gravity center of the display apparatus, and B denotes a width in the left-to-right direction of the effective support region taken along a line passing through an intersection of said vertical line and the effective support region.

15. A display apparatus according to claim 10, wherein said support structure includes a turnable base which is turnable about an axis perpendicular thereto.

16. A display apparatus according to claim 10, wherein said support base, said stand support and said attachment member are disposed to form a shape of a laterally disposed "H" in combination.

17. A display apparatus according to claim 10, wherein said stand support comprises an insulating material.

18. A display apparatus according to claim 10, wherein said stand support and said attachment member are connected to each other via an insulating member.

19. A display apparatus according to claim 10, wherein each said resistance force-adjusting mechanism further includes a spring holder through which the axis member is inserted so as to suppress an elongation at the second free end of the locked spring.

20. A display apparatus comprising:

a flat display panel having a back surface, a gravity center and a weight;

a tilting mechanism having a tilt axis disposed on said back surface of said flat display panel at a position shifted by a deviation X in a horizontal direction from the gravity center and stably holding said flat display panel generally vertically but tiltably at an arbitrary tilt angle within a prescribed tiltable angle range about the tilt axis; and a support structure supporting said flat display panel via said tilting mechanism, wherein said tilting mechanism includes a resistance force-adjusting mechanism disposed at opposite lateral ends thereof, with each said resistance force-adjusting mechanism generating a downward torque $Tr_1$ and an upward torque $Tr_2$ larger than $Tr_1$, wherein the downward torque $Tr_1$ is a torque exerted by said tilting mechanism in resistance to an operation force for upwardly tilting said flat display panel, and the upward torque $Tr_2$ is a torque exerted by said tilting mechanism in resistance to an operation force for downwardly tilting said flat display panel, the downward direction agreeing to a direction of a torque WX caused by the weight W of said flat display panel and the deviation X, and the upward direction being opposite thereto, all the torques being taken about the tilt axis, wherein said resistance force adjusting mechanisms are set to generate the upward torque $Tr_2$ and downward torque $Tr_1$ giving a torque difference $\Delta T$, with $\Delta T=Tr_2-Tr_1$, depending on the torque WX caused by the weight of said flat display panel, said tilting mechanism includes a tilting member tiltably supported by said support structure body via said resistance force-adjusting mechanisms, and each said resistance force-adjusting mechanism includes an axis member and a locked spring which are integrally disposed with one and the other, respectively, of said support structure body and said tilting member, with said axis member being turnable in opposite directions relative to said locked spring to generate different torques during turning in the opposite directions, with said axis member disposed coaxially with said tilt axis and affixed to one of said support structure body and said tilting member, each said locked spring has a first end locked with the other of said support structure body and said tilting member and a second free end, and each said resistance force-adjusting mechanism is so composed that said locked spring has an inner diameter which is decreased to generate a larger frictional force with an outer surface of the axis member corresponding to said upward torque $Tr_2$ when the axis member is turned relative to said locked spring in a direction of winding from the first end to the second end of the locked spring, and is enlarged to generate a smaller frictional force with the outer surface of the axis member corresponding to said downward torque $Tr_1$ when the axis member is turned in a direction opposite to said direction of winding of the locked spring, wherein said tilting member is formed in a laterally elongated shape, and said locked spring at both ends are wound in an identical winding direction with respect to the tilt axis.

21. A display apparatus according to claim 20, wherein said tilt axis is disposed to provide a deviation X from said gravity center of the flat display panel so that said flat display panel can be tilted upward and downward respectively at an operation force giving a horizontal component in the range of 10 to 40 N.

22. A display apparatus according to claim 21, wherein said deviation is set based on deviations $X_1$ and $X_2$ determined according to the following equations:

$$X_1=(F_1l_1-Tr_1)/W,$$

and $$X_2=(Tr_2-F_2l_1)/W,$$

wherein $F_1$ denotes an upward tilting operation force satisfying $10 \leq F_1 \leq 40$ (N), $F_2$ denotes a downward tilting operation force satisfying $10 \leq F_2 \leq 40$ (N), $Tr_1$ denotes a downward torque occurring in resistance to $F_1$, $Tr_2$ denotes an upward torque occurring in resistance to $F_2$ satisfying $Tr_1<Tr_2$, $l_1$ denotes a vertical distance from the tilt axis to a point of application of $F_1$ or $F_2$, and W denotes the weight of said flat display panel.

23. A display apparatus according to claim 22, wherein said deviation X is set to a smaller one of $X_1$ and $X_2$.

24. A display apparatus according to claim 20, wherein said tilt axis is disposed to provide $F_1$ and $F_2$ respectively in the range of 10–40 (N) determined by the following equations when the display unit is held at an upward tilted angle $\alpha$:

$$F_1=\{Tr_1+W(X\cos\alpha+l_2\sin\alpha)\}/(l_1\cos\alpha+X_3\sin\alpha)$$

$$F_2=\{Tr_2-W(X\cos\alpha+l_2\sin\alpha)\}/(l_1\cos\alpha+X_3\sin\alpha),$$

wherein $l_1$ and $X_3$ denote a vertical distance and a horizontal distance, respectively, from the tilt axis to the application point of the tilting operation force, and $l_3$ denotes a vertical distance from the tilt axis to the gravity center of said flat display panel.

25. A display apparatus according to claim 20, wherein said tilting member is disposed on a back side of said flat display panel.

26. A display apparatus according to claim 25, wherein said tilting member is disposed within a projection area of said flat display panel.

27. A display apparatus according to claim 26, wherein said tilting member is formed in a laterally elongated shape having a lateral width—shorter than that of said flat display panel unit where said tilting member is attached.

28. A display apparatus according to claim 20, wherein said support structure body includes a support arm supporting the axis member providing said tilt axis, and said support arm is disposed within a region defined by the following formulae based on a Y-Z coordinate system including an origin taken at the tilt axis, a Y-axis in a front-to-rear direction and a Z-axis in a vertical direction:

$$Z \leq \{(Y-t\cos\beta)/\tan\beta\}-t\sin\beta,$$

$$Z \geq \{(t\cos\gamma-Y)/\tan\gamma\}+t\sin\gamma,$$

wherein $\beta$ and $\gamma$ denote maximum tiltable angles in upward and downward directions, respectively, and t denotes a horizontal distance between the back surface of the said flat display panel and said origin.

29. A display apparatus according to claim 28, wherein said support arm has a stopper for regulating the maximum upward tiltable angle $\gamma$.

30. A display apparatus according to claim 28, wherein said support structure body has a stopper for regulating the maximum downward tiltable angle $\gamma$.

31. A display apparatus according to claim 28, wherein said maximum tiltable angles $\beta$ and $\gamma$ are set to 20 deg. and 5 deg., respectively.

32. A display apparatus according to claim 28, wherein said support structure body includes a turnable base for turnably supporting said support arm.

33. A display apparatus according to claim 20, wherein said resistance force adjusting mechanisms are set to generate the torque difference $\Delta T$ to be substantially equal to two times the torque WX.

34. A display apparatus according to claim 20, wherein said tilting member has an engaging member with which an engageable member provided on a back of said flat display panel to be supported is detachably engageable.

35. A display apparatus according to claim 20, having a gravity center providing a self-standing characteristic.

36. A display apparatus according to claim 20, wherein each said resistance force-adjusting mechanism further includes a spring holder through which the axis member is inserted so as to suppress an elongation at the second free end of the locked spring.

* * * * *

UNITED STATES PATENT AND TRADEMARK OFFICE
CERTIFICATE OF CORRECTION

PATENT NO. : 6,216,989 B1
DATED : April 17, 2001
INVENTOR(S) : Yasushi Shioya et al.

It is certified that error appears in the above-identified patent and that said Letters Patent is hereby corrected as shown below:

Title page,
Item [73], Assignee, please insert the following:
-- [*] Notice: This patent isssued on a continued prosecution application filed under 37 CFR 1.53(d), and is subject to the twenty year patent term provisions of 35 U.S.C. 154(a)(2). --
Item [56], References Cited,
FOREIGN PATENT DOCUMENTS, "6230344" should read -- 6-230344 --.
After FOREIGN PATENT DOCUMENTS, insert the following:
-- R.B Meyer, et al., "Ferroelectric Liquid Crystals", Journal de Physique Lettres, Supplement au Journal de Physique, Tome 36, No. 3, pp. L51-L78 (March 1975).

K. Butsuri, Solid State Physics, Vol. 16, No, 3, pp. 141-151 (1981).

N. Clark, et al. "Submicrosecond Bistable Electro-Optics Switching in Liquid Crystals", Applied Physica Letters, Vol. 36, No. 11, pp. 899-901 (June 1980). --

Drawings,
Sheet 29, Fig. 46, "UNITENTIONAUY" should read -- UNINTENTIONALLY --.

Column 1,
Line 19, "wave," should read -- waves, --.
Line 63, "wave." should read -- waves. --.

Column 6,
Line 33, "splay" should read -- display --.

Column 7,
Line 4, "aper" should read -- at an upper --.

Column 11,
Line 12, "own eight" should read -- weight --

Column 16,
Line 20, "$D=X_4+(h_1+h_2)\tan\theta(7)$." should read -- $D=X_4+(h_1+h_2)\tan\theta$     (7). --

Column 23,
Line 63, "supporting" should read -- support --.

UNITED STATES PATENT AND TRADEMARK OFFICE
CERTIFICATE OF CORRECTION

PATENT NO. : 6,216,989 B1
DATED : April 17, 2001
INVENTOR(S) : Yasushi Shioya et al.

It is certified that error appears in the above-identified patent and that said Letters Patent is hereby corrected as shown below:

Column 24,
Line 8, "a" should read -- A --.

Column 28,
Line 23, "width_____shorter" should read -- width shorter --.
Line 24, "unit" should be deleted.
Line 38, "the" (second occurrence) should be deleted.
Line 42, "angle γ." should read -- angle β. --.

Signed and Sealed this

Ninth Day of April, 2002

Attest:

JAMES E. ROGAN
*Attesting Officer*  *Director of the United States Patent and Trademark Office*